United States Patent
Ragner

(10) Patent No.: US 8,936,046 B2
(45) Date of Patent: Jan. 20, 2015

(54) ELASTIC AND SPRING BIASED RETRACTABLE HOSES

(71) Applicant: Ragner Technology Corporation, Gainesville, FL (US)

(72) Inventor: Gary Dean Ragner, Gainesville, FL (US)

(73) Assignee: Ragner Technology Corporation, Newberry, FL (US)

( * ) Notice: Subject to any disclaimer, the term of this patent is extended or adjusted under 35 U.S.C. 154(b) by 0 days.

(21) Appl. No.: 14/075,963

(22) Filed: Nov. 8, 2013

(65) Prior Publication Data

US 2014/0130930 A1    May 15, 2014

Related U.S. Application Data

(60) Provisional application No. 61/724,890, filed on Nov. 9, 2012, provisional application No. 61/732,291, filed on Dec. 1, 2012, provisional application No. 61/856,054, filed on Jul. 19, 2013.

(51) Int. Cl.
*F16L 11/115* (2006.01)
*F16L 11/118* (2006.01)
*D03D 3/02* (2006.01)

(52) U.S. Cl.
CPC ............... *F16L 11/118* (2013.01); *D03D 3/02* (2013.01)
USPC ............ 138/119; 138/118; 138/121; 138/173

(58) Field of Classification Search
USPC ................................. 138/118, 119, 122, 121
See application file for complete search history.

(56) References Cited

U.S. PATENT DOCUMENTS

| | | | |
|---|---|---|---|
| 2,396,059 A | 3/1946 | Leo et al. |
| 2,867,833 A | 1/1959 | Duff |
| 2,927,625 A | 3/1960 | Rothermel et al. |
| 2,954,802 A | 10/1960 | Duff |
| 3,028,290 A | 4/1962 | Roberts et al. |
| 3,050,087 A | 8/1962 | Caplan |
| 3,288,169 A | 11/1966 | Moss |
| 3,353,996 A | 11/1967 | Hamrick |
| 3,486,532 A | 12/1969 | Sawada |
| 3,520,725 A | 7/1970 | Hamrick |
| 3,623,500 A | 11/1971 | Hoy |

(Continued)

FOREIGN PATENT DOCUMENTS

| | | |
|---|---|---|
| DE | 26 02 502 A | 7/1976 |
| DE | 197 38 329 A | 3/1999 |

(Continued)

OTHER PUBLICATIONS

International Search Report and Written Opinion dated Feb. 13, 2014 for Application No. PCT/US2013/069301.

(Continued)

*Primary Examiner* — Patrick F Brinson
(74) *Attorney, Agent, or Firm* — Frost Brown Todd LLC

(57) ABSTRACT

An extendable and retractable pressure hose can be constructed comprising an input connector, an output connector, an elastic inner hose, an outer cover, and one or more portions of the elastic inner hose engaged with the outer cover and disposed between the first and second ends of the hose. In such a hose, the input connector and output connector can be connected to each end of elastic inner hose and outer cover.

29 Claims, 8 Drawing Sheets

(56) References Cited

U.S. PATENT DOCUMENTS

| | | | |
|---|---|---|---|
| 3,861,424 A | | 1/1975 | Mizutani et al. |
| 3,966,121 A | | 6/1976 | Littman |
| 4,009,734 A | | 3/1977 | Sullivan |
| 4,050,113 A | | 9/1977 | Wright et al. |
| 4,096,888 A | | 6/1978 | Stefano et al. |
| 4,136,149 A | | 1/1979 | Payne |
| 4,704,765 A | | 11/1987 | Ataka |
| 4,955,106 A | | 9/1990 | Stein et al. |
| 5,023,959 A | | 6/1991 | Mercer |
| 5,036,890 A | | 8/1991 | Whaley |
| 5,156,349 A | | 10/1992 | Wilson et al. |
| 5,485,870 A | | 1/1996 | Kraik |
| 5,526,842 A | | 6/1996 | Christensen |
| 5,555,915 A | | 9/1996 | Kanao |
| 5,607,107 A | | 3/1997 | Grieve et al. |
| 5,740,851 A | | 4/1998 | Haynes |
| 5,778,941 A | * | 7/1998 | Inada ............................ 138/134 |
| 5,780,581 A | | 7/1998 | Hermansen et al. |
| 6,024,132 A | | 2/2000 | Fujimoto |
| 6,024,134 A | | 2/2000 | Akedo et al. |
| 6,098,666 A | | 8/2000 | Wells et al. |
| 6,182,327 B1 | | 2/2001 | Gosselin |
| 6,186,181 B1 | | 2/2001 | Schippl |
| 6,223,777 B1 | | 5/2001 | Smith et al. |
| 6,382,241 B1 | | 5/2002 | Setrum |
| 6,523,539 B2 | | 2/2003 | McDonald et al. |
| 6,607,010 B1 | | 8/2003 | Kashy |
| 6,948,527 B2 | * | 9/2005 | Ragner et al. ................. 138/119 |
| 6,983,757 B1 | | 1/2006 | Becker et al. |
| 7,156,127 B2 | | 1/2007 | Moulton et al. |
| 7,398,798 B2 | | 7/2008 | Ostan et al. |
| 7,520,302 B2 | | 4/2009 | Smith |
| 7,549,448 B2 | * | 6/2009 | Ragner .......................... 138/119 |
| 8,291,941 B1 | | 10/2012 | Berardi |
| 8,291,942 B2 | | 10/2012 | Berardi |
| 8,479,776 B2 | * | 7/2013 | Berardi ......................... 138/118 |
| 2002/0013974 A1 | * | 2/2002 | Gibson et al. ................... 15/315 |
| 2004/0231096 A1 | | 11/2004 | Battle et al. |
| 2010/0108170 A1 | | 5/2010 | Chudkosky et al. |
| 2013/0180615 A1 | | 7/2013 | Ragner et al. |

FOREIGN PATENT DOCUMENTS

| | | |
|---|---|---|
| EP | 0 965 689 A | 12/1999 |
| FR | 2 336 624 A | 7/1977 |
| GB | 982 951 | 2/1965 |
| GB | 1 551 429 | 8/1979 |
| GB | 2 310 369 A | 8/1997 |
| JP | 2002-206670 | 7/2002 |
| WO | WO 85/00277 | 1/1985 |
| WO | WO 99/35954 | 7/1999 |
| WO | WO 03/024294 | 3/2003 |
| WO | WO 2012/122601 | 9/2012 |

OTHER PUBLICATIONS

Abstract and English Machine Translation of Japanese Patent No. JP 2002-206670.
US Office Action dated Feb. 26, 2007 for U.S. Appl. No. 11/343,602.
US Office Action dated Apr. 30, 2008 for U.S. Appl. No. 11/343,602.
US Office Action dated Mar. 16, 2012 for U.S. Appl. No. 11/343,602.
US Office Action dated Jun. 13, 2013 for U.S. Appl. No. 11/343,602.
Notice of Allowability dated Feb. 25, 2009 for U.S. Appl. No. 11/234,944.
English language equivalent of German Patent DE 26 02 502.
Abstract and English Machine Translation of German Patent DE 197 38 329.
English language equivalent of French Patent 2 336 624.
U.S. Appl. No. 60/335,497, filed Nov. 24, 2001.
U.S. Appl. No. 60/648,638, filed Jan. 29, 2005.
U.S. Appl. No. 60/739,323, filed Nov. 23, 2005.

\* cited by examiner

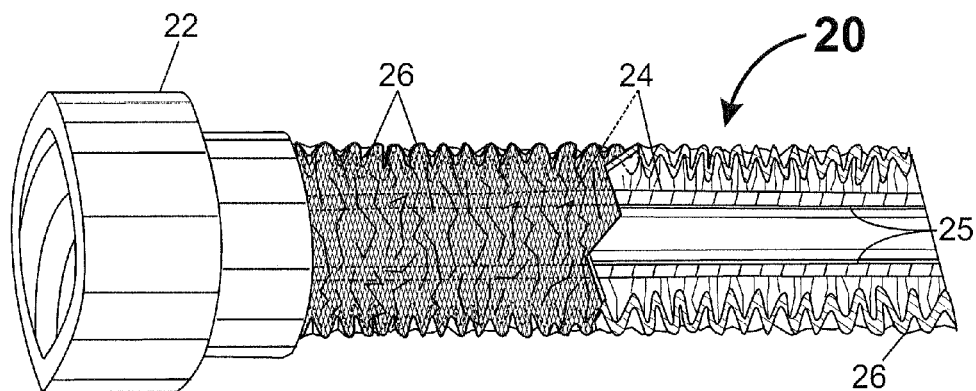
Fig. 1A - Prior Art
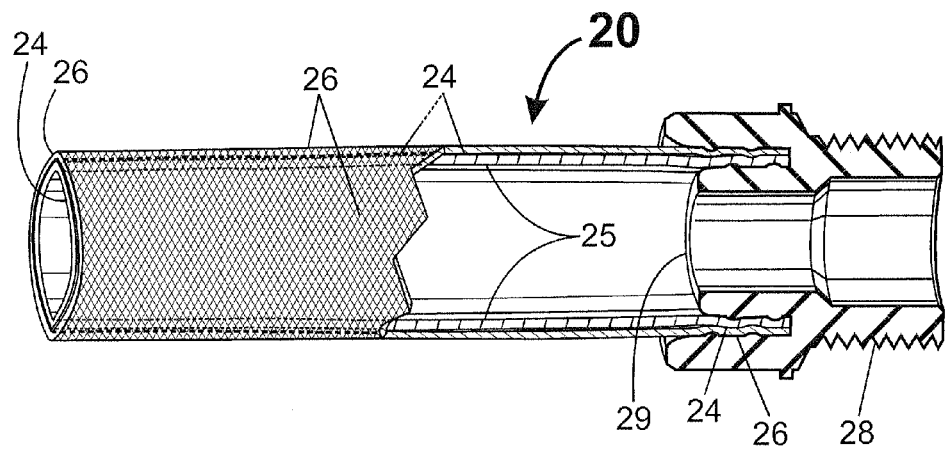
Fig. 1B - Prior Art

ELASTIC AND SPRING BIASED RETRACTABLE HOSES

CROSS REFERENCE TO RELATED APPLICATIONS

This is a non-provisional of, and claims the benefit of, U.S. provisional patent application 61/724,890, filed on Nov. 9, 2012 with the same inventor and title as listed above, U.S. provisional patent application 61/732,291 titled "COLLAPSIBLE HOSES AND PRESSURE SYSTEMS" filed on Dec. 1, 2012 by the same inventor, and U.S. provisional patent application 61/856,054, titled "LUBRICATED ELASTICALLY BIASED STRETCH HOSES" filed on Jul. 19, 2013 by the same inventor.

FIELD

The field of this invention relates to hoses or conduits for transporting pressurized fluids and gasses, and more specifically to hoses or conduits that extend linearly when pressurized, and retract linearly when internal pressure is removed.

BACKGROUND

It is known in the art that linearly extendable and retractable hoses can be created in which extending forces are provided by pressure differentials between water inside the hoses and the ambient environment, and in which retracting forces are provided by elements such as springs or elastic layers which tend to collapse the hose when it is no longer being used to carry water. While extendable and retractable hoses provide certain benefits relative to conventional, fixed length hoses, they are also associated with certain drawbacks, particularly when the retracting forces are provided by elastic layers. For example, prior art extendable and retractable hoses often use water absorbing fiber woven covers, making handling the hose a cold, wet, and dirty experience. Similarly, prior art extendable hoses will often be designed in such a manner that a woven reinforcement cover used to provide structural support to the hose will be exposed to, and will easily be frayed or worn away on, rough surfaces like concrete, asphalt, and brick. Problems have also been experienced in prior art extendable hoses which feature a reinforcement which is separate from an inner hose used to transport water related to the inner hose being caught on the inner surface of the reinforcement cover, raising the risk that the inner hose will stretch and snap. Yet another problem with prior art extendable and retractable hoses is that, if the portion of the hose which provides the retracting force is made out of thermal plastic, it can permanently lose its full elastic properties if pressurized for long periods and/or if heated while extended. Ironically, these same types of hoses (i.e., those in which the portion of the hose which provides the retracting force is made out of thermal plastic) also suffer from the drawback that, until the elastic properties of the hose are lost, the hose will tend to exert a retracting force which is strong enough to prevent the hose from being conveniently used. Accordingly, there is a need in the art for an improved hose design, preferably one which uses an elastic layer to provide retracting force, which will maintain the size change benefits of linearly retractable and extendable design while addressing one or more of the drawbacks which have been experienced with prior art extendable and retractable hoses.

SUMMARY

In the present disclosure, both elastic and wire biased retractable hose designs are presented which solve problems with existing retractable hoses. These improvements comprise not only improvements to the hose, but also hose designs that are easier to manufacture. Several improved elastic hose designs are presented in this disclosure. Exemplary designs, and particular problems those designs can be used to address, are described below. Those designs, as well as other exemplary designs which can be used to improve on prior at extendable and retractable hose designs, are described in more detail in the detailed description section of this document. It should be understood that such designs are intended to be illustrative only of how the inventors' technology can be used to improve upon the current state of the art, and so the discussion of those designs, both in this section and in the detailed description section which follows, should be understood as being illustrative only, and should not be treated limiting.

A first problem with prior art retractable hoses, reinforcement layers which absorb water like a sponge, can be solved by coating the fibers with a hydrophobic material (water repellent) or coating. Water proofing the reinforcement with an elastomer is an option but because of the need for the reinforcement to collapse with the hose this water proofing layer must be relatively thin to allow the hose to easily collapse longitudinally (linearly). Bonding an elastomer to the reinforcement will stiffen it and make it more difficult to retract the hose, so the coating should follow the contours of the fabric and be very flexible. Alternatively, the reinforcement can be coated with a thin layer of hydrophobic material so that the reinforcement tube fibers remain free to move, but water is now repelled by the reinforcement and the small spacing between the fibers means that water cannot easily penetrate the outer fabric tube of the hose. The water repellent would not make the outer reinforcement tube water proof, but would keep the inside of the reinforcement tube relatively dry and help it dry very quickly.

A second problem, involving fraying of external reinforcement layers, can be solved by placing wear surfaces periodically along the hoses length to provide material that can be worn away without damaging the hose. These wear resistant structures can come in a variety of shapes, including but not limited to, rings, dots, buttons, bars, ovals, helical spirals, wavy rings, etc. The shape wear surfaces and their positioning are designed to provide minimal resistance to the reinforcement tube retracting longitudinally. The wear rings, dots, spirals, etc. would be placed around the outside of the hose with a periodic spacing. The more rings, dots, spirals, etc. used, the greater the wear resistance, but the greater the interference with the retracting of the hose. Thus, there is a balance between providing wear resistance and providing easy collapsing of the reinforcement tube cover when the hose is retracted.

A third problem, where a separate inner hose gets out of position within a reinforcement cover can be eliminated by a number of bonding and structural changes. The problem occurs when prior art elastic inner hose binds against reinforcement tube and is stretched excessively along one section of the inner elastic tube. This occurs because pressure within the inner hose can cause the inner hose to expand against the inside of the reinforcement cover, and because of unevenness in the reinforcement tube surface become locked in place at several places by friction. Then as the reinforcement cover extends (unfolds longitudinally), sections of the inner hose can be held in place against two points within the cover by friction. If too much unexpended reinforcement cover material exists between these two friction points the elastic inner hose can be stretched beyond its limit in that section and break. This over stretching of the inner hose can cause the inner hose break or snap, ruining the hose. This problem can be solved by three methods: A) by periodically holding the elastic inner hose in position within the reinforcement cover along the length of the hose, B) corrugating or convoluting the elastic inner hose to reduce stresses on the hose and increase its ability to stretch longitudinally, C) eliminate the need for the inner tube to provide the retracting force (biasing force) and instead have it bonded to the inside of the reinforcement tube. This bonding can comprise periodic bonding zones, random bonding zones, spiral bond zones, ring bond zones, full surface bonding, or etc. The means of holding the reinforcement cover to the elastic inner hose in items B) and C) can comprise a variety of holding options, such as, a plurality of adhesive spots placed periodically along the length of the hose (bonding the elastic inner hose to the reinforcement cover at those spots), ring shaped bonding zones, spiral shaped bonding zones, friction contact, etc. The spacing of these bonding zones and/or friction points can be chosen far enough apart so as to not overly restrict the retraction of the reinforcement cover, but placed close enough together to prevent the elastic inner hose from binding on the cover over long distances and then being over-extended. Friction contact points can be achieved by choosing a ridged elastic inner hose (convoluted, corrugated, bumps, etc.) that makes contact with the inside of the reinforcement cover periodically even when no relative pressure is applied to the inside of the inner hose. In this way, the inner hose prevents the reinforcement cover from slipping excessively out of position to stretch one portion of the elastic inner tube more than another portion.

A fourth problem, involving an elastic inner hose being permanently stretched, can be minimized by using a thermal set elastomer that is very resistant to thermal deformation. Thermal plastic elastomers are easy to process and use, but when stretched they tend to creep and slowly lose their ability to return to their original shape. This is especially true at higher temperatures where thermal plastic elastomers become a thick liquid that will slowly deform to take on its new shape. This means that if the hose is left out in the sun all day, the elastic inner hose portion of the hose will tend to lose a large percentage of its recoil ability and be permanently stretched. To minimize this problem, thermal set elastomers can be used which permanently cross-link their polymer chains and form a crystal structure that does not melt and become liquid at high temperatures. While even thermal set elastomers creep some at higher temperatures, it is much less than thermal plastic elastomers. Thus, thermal set elastomers can be much more resistant to permanent deformation. Also, if they are heated while stretched and loose some of their recoil ability, removing the stress and reheating the thermal set elastomer will often cause it to return to its original shape, restoring its ability to retract fully.

A fifth problem, where an elastic inner tube provides too great a retracting force, can be solved by a number of means, one of which is not to use an elastic inner tube to provide the retracting force or biasing. Instead a coiled spring structure can be used to retract the hose, and the inner water proof hose can be made very thin and bonded periodically or completely to the inside of the reinforced fabric cover. This arrangement relieves the inner hose from the stresses that result from using it as the biasing means (retracting force provider) and allows it simply to press up against the outer reinforcement tube to provide a liquid and gas tight hose. This design solves problems (3), (4), and (5) above, to prevent over stretching the inner hose, loss of elastic biasing force, and provides manageable retracting forces, respectfully. Also, with the coiled biasing on the outside of the hose, this structure can solve problem 2) by providing wear protection for the fabric reinforcement. The retracting bias of the inner hose can also be reduced by increasing the diameter of the inner hose and thinning the wall. Also, by corrugating the inner elastic hose or convoluting it, the amount of longitudinal stretching of the inner hose can be reduced.

A sixth problem is encountered where a retractable hose which relies on an elastic inner tube to provide a retracting force is constructed such that the inner elastic tube is required to undergo significant radial expansion when the hose is stretching in a longitudinal direction. This can unnecessarily limit the potential longitudinal expansion of the hose relative to the limits of the elastic materials. For example, a prior art hose with an elastic inner that has an outside diameter approximately one-half the inside diameter of the outer cover will require the inner tube to stretch radially to two times its original size to expand against the inside wall of the outer cover. This tends to reduce the ability of the inner tube to expand longitudinally in half. Thus, if an elastic material can extend six times its original length half this extension is taken up by the doubling of its diameter, so that the inner tube can only extend approximately three times its length before breaking. This problem can be solved by increasing the diameter of the elastic inner tube so that less expansion occurs in the radial direction so more expansion can be used in the longitudinal direction. By increasing the diameter of the elastic inner tube, stretch hoses with longitudinal expansion ratios of six times or more have been built by the applicant.

By employing one or more of these improvements to a retractable hose one can solve many problems now associated with prior art retractable hose designs that use elastic material to provide the retracting force. The improvements disclosed here provide an improved user experience with the hose, by keeping the hose dry, preventing destructive wear, preventing breakage of the elastic inner hose, minimizing the effects of heat on the ability of the hose to retract, and reducing the retraction force so that the hose is easier to use. Accordingly, several objects and advantages can be achieved using the disclosed technology. These include:

Preventing Water Absorption
  a) To provide a linearly retractable pressure hose (longitudinally retractable hose) with a means for substantially reducing the absorption of water by the exterior reinforcement cover of the linearly retractable hose.
  b) To provide the exterior reinforcement cover of a linearly retractable pressure hose with a hydrophobic surface to significantly reduce water absorption and drying time of the exterior of the hose.
  c) To provide the exterior reinforcement cover of a linearly retractable pressure hose with a water repellent coating to significantly reduce water absorption and drying time of the exterior of the hose.
  d) To provide the exterior reinforcement cover of a linearly retractable pressure hose with a flexible water proof coating to substantially prevent water absorption into the exterior reinforcement cover of the hose.
  e) To provide the exterior reinforcement cover of a linearly retractable pressure hose with a flexible elastomer coating to substantially prevent water absorption into the exterior reinforcement cover of the hose.

Protecting Outer Fabric Cover
  f) To provide the exterior reinforcement cover of a linearly retractable pressure hose with periodic wear preventing structures to protect the exterior reinforcement cover from damage due to wear.
  g) To provide the exterior reinforcement cover of a linearly retractable pressure hose with periodic wear preventing structures in the form of multiple dots, button, and/or other shaped protrusions of wear resistant material across its outer surface to protect the exterior reinforcement cover from damage due to wear.
h) To provide the exterior reinforcement cover of a linearly retractable pressure hose with periodic wear preventing structures in the form of concentric rings of wear resistant material along the length of the hose to protect the exterior reinforcement cover from damage due to wear.
i) To provide the exterior reinforcement cover of a linearly retractable pressure hose with periodic wear preventing structures in the form of a spiral coil of wear resistant material around the exterior of the exterior reinforcement cover to protect the exterior reinforcement cover from damage due to wear.
j) To provide a linearly retractable pressure hose with a plurality of wear resistant rings spaced periodically along the length of the hose with each ring encircling the hose and protruding from the surface of the hose.
k) To provide a linearly retractable pressure hose with a plurality of wear resistant rings bonded periodically to along the length of the hose with each ring encircling the hose and protruding from the surface of the hose. Wherein the wear resistant ring defines a constriction in the linearly retractable hose for creating a friction point between a reinforcement cover and an elastic inner hose. Whereby these friction points stabilize the sliding motion of the elastic inner hose within the reinforcement cover to prevent localized over-stretching and breakage of the elastic inner hose.
l) To provide a linearly retractable pressure hose comprising a reinforcement cover and an elastic inner hose wherein a plurality of annular constrictions in the reinforcement cover creating a friction points between the reinforcement cover and the elastic inner hose. Whereby these friction points stabilize the sliding motion of the elastic inner hose within the reinforcement cover to prevent localized over-stretching and breakage of the elastic inner hose. Wherein the annular constrictions are defined by wear resistant rings.
m) To provide a linearly retractable pressure hose comprising a reinforcement cover and an elastic inner hose wherein a plurality of small wear dots are bonded periodically to the outer reinforcement cover. Wherein these small wear dots are small enough to fold over one another radially.
n) To provide a linearly retractable pressure hose comprising a reinforcement cover and an elastic inner hose wherein a plurality of small wear dots are bonded periodically to the outer reinforcement cover. Wherein these small wear dots are bond zone is smaller than a diameter of the small wear dots.

Protecting Inner Hose o) To provide a linearly retractable pressure hose comprising a reinforcement cover and an elastic inner hose with a plurality of annular constrictions in the reinforcement cover creating a friction points between the reinforcement cover and the elastic inner hose. Whereby these friction points stabilize the sliding motion of the elastic inner hose within the reinforcement cover to prevent localized over-stretching and breakage of the elastic inner hose.
p) To provide a linearly retractable pressure hose comprising a reinforcement cover and an elastic inner hose with a plurality of annular wear rings that produce constrictions in the reinforcement cover to create a friction points between the reinforcement cover and the elastic inner hose. Whereby these friction points stabilize the sliding motion of the elastic inner hose within the reinforcement cover to prevent localized over-stretching and breakage of the elastic inner hose.
q) To provide a linearly retractable pressure hose comprising a reinforcement cover and an elastic inner hose with a plurality of annular wear rings that produce constrictions in the reinforcement cover to create a friction points between the reinforcement cover and the elastic inner hose. Whereby the longitudinal thickness of the annular wear rings prevent over compression of the outer reinforcement cover to prevent localized over-stretching and breakage of the elastic inner hose.
r) To provide a linearly retractable pressure hose comprising a reinforcement cover and an elastic inner hose, wherein the elastic inner hose defines a plurality of friction points that contact the inside surface of the exterior reinforcement cover to stabilize the elastic inner hose within the reinforcement cover and minimize localized over-stretching and breakage of the elastic inner hose.
s) To provide a linearly retractable pressure hose comprising a reinforcement cover and an elastic inner hose, wherein the elastic inner hose defines a plurality of friction points that contact the inside surface of the exterior reinforcement cover to stabilize the elastic inner hose within the reinforcement cover and minimize localized over-stretching and breakage of the elastic inner hose. Wherein the elastic inner hose defines a 1) convoluted shape, 2) corrugated shape, and/or 3) exterior surface with bumps.
t) To provide a linearly retractable pressure hose comprising a reinforcement cover and an elastic inner hose with a plurality of annular bonds (ring shaped bonds) between the reinforcement cover and the elastic inner hose for stabilizing the elastic inner hose within the reinforcement cover to prevent localized over-stretching and breakage of the elastic inner hose.
u) To provide a linearly retractable pressure hose comprising a reinforcement cover and an elastic inner hose, wherein a plurality of ring shaped bonds between the reinforcement cover and the elastic inner hose are used to stabilize the elastic inner hose within the reinforcement cover to prevent localized over-stretching and breakage of the elastic inner hose.
v) To provide a linearly retractable pressure hose comprising a reinforcement cover and an elastic inner hose, wherein a plurality of point bonds (dot and/or short line shaped bonds) between the reinforcement cover and the elastic inner hose are used to stabilize the elastic inner hose within the reinforcement cover to prevent localized over-stretching and breakage of the elastic inner hose.
w) To provide a linearly retractable pressure hose comprising a reinforcement cover and an elastic inner hose, wherein a spiral shaped bond down the length of the hose securing the reinforcement cover and the elastic inner hose to one another along a spiral path to stabilize the elastic inner hose within the reinforcement cover and reduce the chances of localized over-stretching and breakage of the elastic inner hose.
x) To provide a linearly retractable pressure hose comprising a reinforcement cover and an elastic inner hose, wherein the inner hose defines a ridged nature (e.g. convoluted, corrugated, etc.), wherein the ridges frictionally interact with the interior wall of the outer cover and/or are bonded to the interior wall of the outer cover, to stabilize the elastic inner hose within the reinforcement cover to prevent localized over-stretching and breakage of the elastic inner hose.

y) To provide a linearly retractable pressure hose comprising an outer reinforcement cover and an elastic inner hose, wherein the inner hose defines a bonding ridge (e.g. convoluted ridge, parallel rings, short ridge sections, etc.) protruding from its exterior surface, wherein the bonding ridge can frictionally interact with the interior wall of the outer cover to stabilize the elastic inner hose within the reinforcement cover and prevent localized overstretching and breakage of the elastic inner hose.

z) To provide a linearly retractable pressure hose comprising an outer reinforcement cover and an elastic inner hose, wherein the inner hose defines a bonding ridge (e.g. convoluted ridge, parallel rings, short ridge sections, etc.) protruding from its exterior surface, wherein the bonding ridge is bonded to the interior wall of the outer cover to stabilize the elastic inner hose within the reinforcement cover and prevent localized over-stretching and breakage of the elastic inner hose.

Maintaining Elastic Retraction aa) To provide a linearly retractable pressure hose comprising a reinforcement cover and an elastic inner hose wherein the elastic inner hose is made from a thermal set polymer.

bb) To provide a linearly retractable pressure hose comprising a reinforcement cover and a flexible inner hose, where the flexible inner hose has substantially the same natural length as the reinforcement cover and closely follows the inside surface of the reinforcement cover, wherein the flexible inner hose can crumple and fold to retract longitudinally along with the reinforcement cover to provide the hose with an extended length that is greater than two times its retracted length. The biasing to retract the hose is provided by a coiled spring mounted on either the interior or exterior of the hose and/or cover.

cc) To provide a linearly retractable pressure hose comprising a reinforcement cover and an elastic inner hose, where the elastic inner hose has a slightly shorter natural length than the reinforcement cover to reduce the need for it to crumple and fold when retracted but does not provide sufficient retracting force to significantly retract the retractable hose, wherein the elastic inner hose can retract, crumple and fold to retract longitudinally along with the reinforcement cover to provide the hose with an extended length that is greater than two times its retracted length. A coiled spring mounted on either the interior or exterior of the hose and/or cover to provide the hose with an extended length that is greater than two times its retracted length. The biasing to retract the hose is provided by a coiled spring mounted on either the interior or exterior of the hose and/or cover.

dd) To provide a linearly retractable pressure hose comprising a outer reinforcement cover and a flexible inner hose which are bonded periodically along their lengths to each other, wherein the flexible inner hose can retract, crumple and fold to retract longitudinally along with the reinforcement cover to provide the retractable hose with an extended length that is greater than two times its retracted length. The biasing to retract the hose is wholly or partially provided by a coiled spring mounted on either the interior or exterior of the hose.

ee) To provide a linearly retractable pressure hose comprising a outer reinforcement cover and a flexible inner hose which are substantially bonded together along their lengths, wherein the flexible inner hose can crumple and fold to retract longitudinally along with the reinforcement cover to provide the retractable hose with an extended length that is greater than two times its retracted length. The biasing to retract the hose is provided by a coiled spring mounted on either the interior or exterior of the hose and/or cover.

ff) To provide a linearly retractable pressure hose comprising a outer reinforcement cover and an elastic inner hose where the strain created in the elastic interior hose when the hose is extended is reduced by enlarging the inner hose's diameter so that less radial expansion is needed to contact the outer reinforcement cover. The biasing of the retractable hose is provided by the elastic inner hose.

gg) To provide a linearly retractable pressure hose comprising a reinforcement cover and an elastic inner hose, wherein the elastic inner hose defines a ridged nature (e.g. convoluted, corrugated, etc.), wherein the ridges physically increase the longitudinal path length of the inner hose surface, wherein the strain on the inner hose when expanded and extended is reduced compared to that of a cylindrical inner hose. The biasing of the retractable hose is provided by the elastic inner hose.

Wire Biased Straight Hose hh) To provide a linearly retractable pressure hose comprising a reinforcement cover and an inner flexible thin-walled hose, where the inner flexible thin-walled hose is substantially bonded to the inside surface of the reinforcement cover, wherein the inner flexible thin-walled hose can crumple and fold to retract longitudinally along with the reinforcement cover to provide the hose with an extended length that is greater than two times its retracted length. Wherein the biasing to retract the hose is provided by a coiled spring positioned on either the interior or exterior of the hose and/or cover.

ii) To provide a linearly retractable pressure hose comprising a outer reinforcement cover and an inner flexible thin-walled hose, where the inner flexible thin-walled hose closely follows the inside surface of the reinforcement cover and is bonded periodically along its lengths to the reinforcement cover, wherein the inner flexible thin-walled hose can crumple and fold to retract longitudinally inside the reinforcement cover to provide the hose with an extended length that is greater than two times its retracted length. The biasing to retract the hose is provided by a coiled spring mounted on either the interior or exterior of the hose and/or cover.

jj) To provide a linearly retractable pressure hose comprising a outer reinforcement cover and an inner flexible thin-walled hose, where the inner flexible thin-walled hose is held snugly against the inner surface of the reinforcement cover by a coiled spring on the length of the interior of the hose. wherein the inner flexible thin-walled hose can crumple and fold to retract longitudinally inside the reinforcement cover to provide the hose with an extended length that is greater than two times its retracted length. The biasing to retract the hose is provided by the coiled spring mounted on the interior of the hose and/or cover.

kk) To provide a linearly retractable pressure hose comprising a outer reinforcement cover coated with a flexible polymer to form a water-tight and/or air-tight hose, wherein the reinforcement cover forms a thin-walled hose that can crumple and fold to retract longitudinally and provide the hose with an extended length that is greater than two times its retracted length. The biasing to retract the hose is provided by a coiled spring positioned on either the interior or exterior the of the hose and/or cover.

ll) To provide a linearly retractable pressure hose comprising a outer reinforcement cover and an inner flexible thin-walled hose, where the inner flexible thin-walled hose closely follows the inside surface of the reinforcement cover and is bonded periodically to the reinforcement cover, wherein the inner flexible thin-walled hose can crumple and fold to retract longitudinally inside the reinforcement cover to provide the hose with an extended length that is greater than two times its retracted length. The biasing to retract the hose is provided by a coiled spring mounted on either the interior or exterior of the hose and/or cover.

mm) To provide a linearly retractable pressure hose comprising a outer reinforcement cover and an inner flexible thin-walled hose, where the inner flexible thin-walled hose comprises an flexible polymer layer bonded to a thin backing layer, wherein the backing layer can comprise woven or knitted fibers, polymer sheet(s) and/or non-woven fabrics or meshes, wherein the inner flexible thin-walled hose can crumple and fold to retract longitudinally. The biasing to retract the hose is provided by a coiled spring mounted on either the interior or exterior of the hose and/or cover.

Bonded Elastic Hose nn) To provide a linearly retractable pressure hose comprising a tube shaped outer reinforcement cover and an inner elastic hose, where the inner elastic hose provides a retracting bias to retract the retractable hose, where the inner elastic hose is bonded to the outer reinforcement cover at a plurality of separate areas to control the longitudinal collapse and folding of the outer reinforcement cover when the linearly retractable pressure hose retracts.

oo) To provide a linearly retractable pressure hose comprising a tube shaped outer reinforcement cover and an inner elastic hose, where the inner elastic hose provides a retracting bias to retract the retractable hose, wherein the inner elastic hose is bonded periodically to the outer reinforcement cover with a plurality of annular ring shaped bonds for longitudinal controlling the collapse and folding of the outer reinforcement cover when the linearly retractable pressure hose retracts.

pp) To provide a linearly retractable pressure hose comprising a outer reinforcement cover encompassing an inner elastic hose, where the inner elastic hose provides a retracting bias to retract the retractable hose, wherein the inner elastic hose is bonded to the inside of the outer reinforcement cover with a plurality of small bond zones across its surface to control the longitudinal collapse and folding of the outer reinforcement cover when the linearly retractable pressure hose retracts.

qq) To provide a linearly retractable pressure hose comprising a outer reinforcement cover and an inner elastic hose, where the inner elastic hose is a substantially cylindrical tube and provides a retracting bias for retracting the retractable hose, wherein the inner elastic hose is bonded periodically to the inside of the outer reinforcement cover to control the longitudinal collapse and folding of the outer reinforcement cover when the linearly retractable pressure hose retracts.

rr) To provide a linearly retractable pressure hose comprising a outer reinforcement cover and an inner elastic hose, where the inner elastic hose is a substantially cylindrical tube and provides a retracting bias for retracting the retractable hose, wherein the inner elastic hose is bonded to the inside of the outer reinforcement cover at a plurality of locations to control the longitudinal collapse and folding of the outer reinforcement cover when the linearly retractable pressure hose retracts.

ss) To provide a linearly retractable pressure hose comprising a outer reinforcement cover and an inner elastic hose, where the inner elastic hose has a corrugated shape and provides a retracting bias for retracting the retractable hose, wherein the inner elastic hose is bonded periodically to the inside of the outer reinforcement cover to control the longitudinal collapse and folding of the outer reinforcement cover when the linearly retractable pressure hose retracts.

tt) To provide a linearly retractable pressure hose comprising a outer reinforcement cover and an inner elastic hose, where the inner elastic hose has a convoluted shape and provides a retracting bias for retracting the retractable hose, wherein the inner elastic hose is bonded at its outer ridge to the inside of the outer reinforcement cover to control the longitudinal collapse and folding of the outer reinforcement cover when the linearly retractable pressure hose retracts.

uu) To provide a linearly retractable pressure hose comprising a outer reinforcement cover and an inner elastic hose, where the inner elastic hose has a corrugated shape and provides a retracting bias for retracting the retractable hose, wherein the inner elastic hose has a natural outside diameter at its ridges that is larger than the natural diameter of the interior of the outer cover. Wherein the ridges of the inner elastic hose provide periodical frictional contact with the inside of the outer reinforcement cover to control the longitudinal collapse and folding of the outer reinforcement cover when the linearly retractable pressure hose retracts.

vv) To provide a linearly retractable pressure hose comprising a outer reinforcement cover and an inner elastic hose, where the inner elastic hose has a convoluted shape and provides a retracting bias for retracting the retractable hose. Wherein the inner elastic hose has a natural outside diameter at its ridges that is larger than the natural diameter of the interior of the outer cover. Wherein the ridges of the inner elastic hose provide periodical frictional contact with the inside of the outer reinforcement cover to control the longitudinal collapse and folding of the outer reinforcement cover when the linearly retractable pressure hose retracts.

ww) To provide a linearly retractable pressure hose comprising a outer reinforcement cover and an inner elastic hose, where the inner elastic hose has a ridged shape (e.g. corrugated, convoluted, bumps, etc.) and provides a retracting bias for retracting the retractable hose. Wherein the inner elastic hose has a natural outside diameter at its ridges that is substantially the same as the natural diameter of the interior surface of the outer cover. Wherein the ridges of the inner elastic hose provide periodical frictional contact with the inside of the outer reinforcement cover to control the longitudinal collapse and folding of the outer reinforcement cover when the linearly retractable pressure hose retracts.

xx) To provide a linearly retractable pressure hose comprising a outer reinforcement cover and an inner elastic hose, where the inner elastic hose has a ridged shape (e.g. corrugated, convoluted, bumps, etc.) and provides a retracting bias for retracting the retractable hose. Wherein the inner elastic hose has a natural outside diameter at its ridges that is smaller than the natural diameter of the interior surface of the outer cover. Wherein the ridges of the inner elastic hose provide periodical frictional contact with the inside of the outer reinforcement cover when pressure is applied to the interior of the inner hose. This helps control the longitudinal collapse and folding of the outer reinforcement cover when the linearly retractable pressure hose retracts.

yy) To provide a linearly retractable pressure hose comprising a outer reinforcement cover and an inner elastic hose, where the inner elastic hose has a ridged shape (e.g. corrugated, convoluted, bumps, etc.) and provides a retracting bias for retracting the retractable hose. Wherein the inner elastic hose is bonded at its ridges to the interior surface of the outer cover. Wherein the bonding points provide periodically stabilized contact with the inside of the outer reinforcement cover to control the longitudinal collapse and folding of the outer reinforcement cover around the inner hose when the linearly retractable pressure hose retracts.

zz) To provide a linearly retractable pressure hose comprising an outer reinforcement cover and an elastic inner hose, wherein the inner hose defines a bonding zone (e.g. convoluted or helical ridge, parallel rings, short ridge sections, dots or patches, etc.) protruding from its exterior surface, wherein the inner elastic hose is bonded at the outer edge pf its ridge(s) to the interior surface of the outer cover. Wherein the bonding points provide periodically stabilized contact with the inside of the outer reinforcement cover to control the longitudinal collapse and folding of the outer reinforcement cover around the inner hose when the linearly retractable pressure hose retracts.

Microwave Bonding Adhesives aaa) An adhesive designed to absorb microwave radiation, wherein the application of sufficient microwave radiation to the adhesive causes the adhesive to go from a tack-free state to an adhesive state for bonding to surfaces physically in contact with the adhesive.

bbb) An adhesive designed to absorb microwave radiation, wherein the application of sufficient microwave radiation to the adhesive causes the adhesive to go from a tack-free state to a melted state that can bond to surfaces physically in contact with the adhesive.

ccc) An adhesive sheet designed to absorb microwave radiation, wherein the application of sufficient microwave radiation to the adhesive sheet causes the adhesive sheet to go from a tack-free state to an adhesive state for bond to surfaces physically in contact with the adhesive.

ddd) An adhesive sheet designed to absorb microwave radiation, wherein the application of sufficient microwave radiation to the adhesive sheet causes the adhesive sheet to go from a tack-free state to a melted state for bond to surfaces physically in contact with the adhesive.

eee) A method of bonding two surfaces together with an microwave absorbing adhesive, comprising the steps of:
1) coating a first surface with a microwave absorbing adhesive, wherein after coating the microwave absorbing adhesive becomes tack-free and bonded to the first surface,
2) positioning the coated first surface in physical contact with a second surface,
3) applying microwave radiation to the microwave absorbing adhesive, wherein the adhesive is heated by the microwave radiation and thermally bonded to the second surface.

fff) The above method including the step of 4) removing the microwave radiation from the microwave absorbing adhesive and allowing the adhesive to cure and/or cool.

ggg) A method of bonding two surfaces together with an microwave absorbing adhesive, comprising the steps of:
1) coating a first surface with a microwave absorbing adhesive, wherein after coating the first surface with microwave absorbing adhesive the adhesive becomes tack-free.
2) positioning the coated first surface near a second surface,
3) applying microwave radiation to the microwave absorbing adhesive, wherein the adhesive is heated by the microwave radiation and becomes an activated adhesive, and
4) pressing the activated adhesive against the second surface so that the activated adhesive bonds to the first and second surfaces together.

hhh) The above method including the step of: 5) removing the microwave radiation from the microwave absorbing adhesive and allowing the adhesive to cure and/or cool.

BRIEF DESCRIPTION OF THE DRAWINGS

FIG. 1A Prior Art elastic stretch hose input end (faucet connector end).

FIG. 1B Prior Art elastic stretch hose output end (nozzle connector end).

DETAILED DESCRIPTION

Figure 2A:
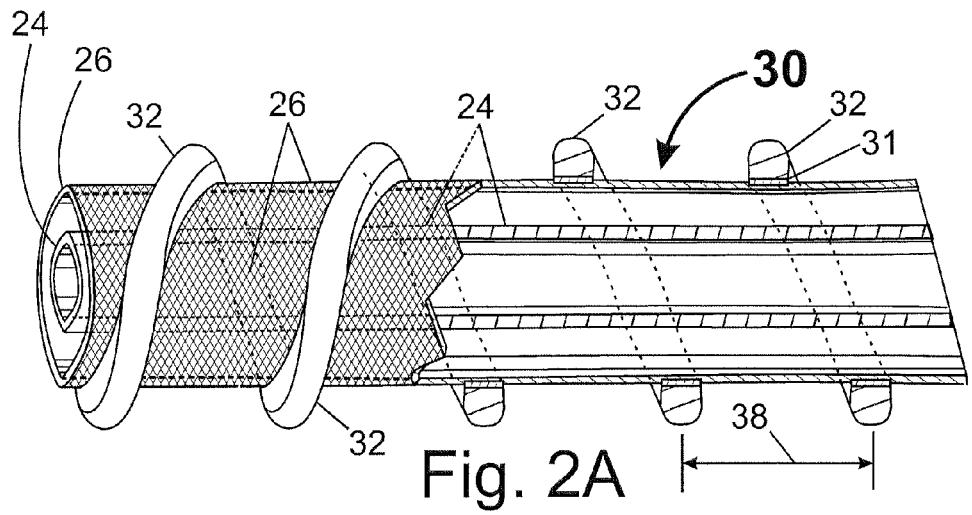
FIG. 2A Elastic stretch hose with helical wear ridge protector.

In FIG. 1A-B, we see a perspective section view of an exemplary prior art extendable and retractable pressure hose 20. FIG. 1A shows hose 20 in its relaxed state (unpressurized), while FIG. 1B shows hose 20 in its pressurized operational state. Retractable hose 20 comprises an elastic inner hose 24, a woven reinforcement outer cover 26, an inlet connector 22, and an outlet connector 28. Inner hose 24 extends through outer hose 26 where the natural length of elastic inner hose 24 is less than half the natural length of woven outer cover 26. Inner hose 24 has approximately half the diameter of the outer cover to allow significant extension of the retractable hose 20 before the inner hose 24 is forced up against the interior surface of outer cover 26. This helps protect the inner hose from being over extended by the expanding outer cover. Both inner hose 24 and outer cover 26 are cylindrical in shape and when inner hose is pressurized from within, the inner hose 24 is forced to expand both radially and longitudinally against outer cover 26. This pressure extends outer cover 26 to its fully extended cylindrical length as seen in FIG. 1B. A water inlet connector 22 is attached to one end of both the inner hose 24 and outer cover 26, and outlet connector 28 is connected to the other end of inner hose 24 and outer cover 26. Inner hose 24 and outer cover 26 are only attached (secured) at the connectors and are free to slide longitudinally with respect to one another between connectors 22 and 28. Inlet connector 22 is designed to attach to a standard residential water faucet. Outlet connector 28 is designed to connect to a spray nozzle or other garden hose nozzle which acts as a flow restriction device to increase pressure within the hose to expand it. Outlet end 28 also includes its own flow restriction ridge 29 to increase internal pressure that helps expand inner hose 24. When water pressure is released, the pressure inside hose 20 can return to atmospheric pressure and the elastic nature of inner hose 24 pulls hose 20 back to its retracted state seen in FIG. 1A.

In FIGS. 2A through 3C, we see several examples of retractable hoses. Each of these examples show the inner hoses 24, 64 and 74 in their substantially relaxed state or natural state (no internal pressure), and shows outer cover 26 in its substantially pressurized or extended state (operational state, internal pressure). This mix of states is done to allow the reader to more easily see the relationship between the relaxed diameter of the inner hoses and the expanded diameter of outer cover 26. Each of these examples uses the same outer cover 26 for comparison purposes, and comprise a straight cylinder shaped reinforced cover. In alternate examples outer cover 26 can be woven with variations in its effective diameter to facilitate longitudinal retraction or collapse of the cover and also help lock the position of its inner hose in place to prevent damage to the inner hose.

In FIGS. 2A through 3A, we see several different ways of providing wear protection for the outer cover. During normal use, hoses like the retractable pressure hoses 20, 30, 40, 40a and 50 are susceptible to damage to the woven outer cover 26. Dragging cover 26 over concrete or other abrasive surfaces can quickly wear and damage the integrity of the cover. To improve the durability of this type of fabric cover, various wear resistant structures can be bonded to the outside of hose cover 26. These wear resistant structures can comprise wear resistant polymers, metals, composites, or other wear resistant materials. These wear resistant structures can be bonded to outer cover 26 by various known bonding methods, such as, mechanically bonding, thermally bonded, adhesively bonded, bonded interface material, or other bonding methods. The thickness of the wear resistant structures can be increased or decreased depending on the greater or lesser, respectfully, wear resistance needed. The wear resistant structure(s) must also allow outer cover 26 to retract (see example in FIG. 1A) where outer cover 26 is compressed longitudinally into a folded or crumpled structure that is much shorter than its fully extended length. In each of the drawings in FIGS. 2A through 3B, outer cover 26 is shown in its expanded state and inner hose 24 is shown in its unpressurized and unextended state. This combination, where cover 26 is expanded and inner hose 24 relaxed is generally not seen at the same time in this type of hose, but selecting these two states allows the reader to see the two structures in their natural state at the same time. Also, each retractable hose example presented in this patent can connect its inner hose and outer cover 26 to end connectors 22 and 28 as seen in FIGS. 1A and 1B, respectively, or similar end connectors. Each of the examples presented in this disclosure can have its outer cover 26 coated with a water repellant coating, or layer, to keep water and dirt from entering outer cover 26. Such water repellant coatings might be a spray on hydrophobic material like Scotch Guard or other hydrophobic spray on material. The water repellant coating might be a dip applied hydrophobic material that can be applied to the fibers before weaving or to the entire woven cover after it is woven. Finally, a water repellant layer might be used that is applied to the outer surface of outer cover 26 to form a thin water proof and/or water repellant layer or coating. Such a water repellant layer can comprise various polymers that can be extruded, coated, sprayed, or otherwise layered onto the exterior surface of the outer cover for the hose.

In FIG. 2A, we see a perspective section view of retractable stretch hose 30 (retractable pressure hose), comprising an elastic inner hose 24, an outer cover 26, a spiral wear strip 32 and a bonding material layer 31. Inner hose 24 and outer cover 26 are the same as seen in FIGS. 1A-B, and can use connectors 22 and 28 as shown. In FIG. 2A, wear strip 32 is shown bonded to outer cover 26 by bonding layer 31. Bonding layer 31 is optional if wear strip 32 can be chemically, thermally or mechanically (physically melted around the cover's fibers) bonded to fabric outer cover 26. In cases, where strip 32 is made of a material that cannot be directly bonded, one or more interface bonding layers 31 can be used. Bonding layer 31 can comprise an adhesive and/or polymer that will bond to both strip 32 and cover 26. This is especially useful if strip 32 and cover 26 are made of very different materials. Bonding layer 31 can also comprise a coating(s) on either cover 26 and/or strip 32, that allows cover 26 and strip 32 to be bonded together. Bonding layer 31 can also be made of a flexible material to provide a resilient interface between the foldable outer cover 26 and the harder wear-resistant wear strip 32. Helical wear strip 32 can be broken up into multiple coil sections as desired. Wear strip 32 should allow the hose to retract to its fully retracted position. Thus, any wear resistant strip, ring, and/or buttons needs to allow the outer cover 26 to fold up longitudinally and retract longitudinally similar to the way cover 26 is folded and retracted in FIG. 1A. In alternative designs, two or more coils of wear strips can be used adjacent each other so that the angle at which they spiral around outer cover 26 can be increased while still keeping the spacing between coils the same as coil pitch 38 for wear strip 32.

Figure 2B:
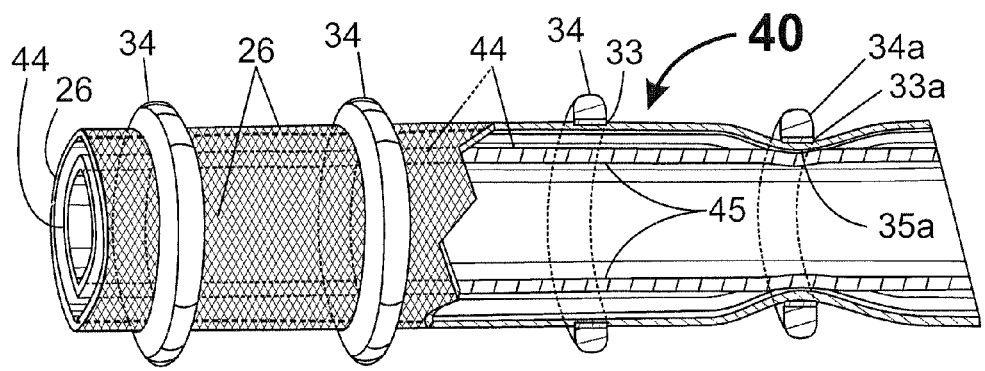
FIG. 2B Elastic stretch hose with annular (ring shaped) wear ridge protectors.

In FIG. 2B, we see a perspective section view of retractable pressure hose 40, comprising an elastic inner hose 44, an outer cover 26, a plurality of circular wear rings 34 and 34a, and a bonding material 33 and 33a. Construction of hose 40 is very similar to hose 30 except instead of a spiral wear strip, a plurality of wear rings 34 and/or 34a are bonded periodically along the length of hose 40. Also, inner hose 44 has a larger diameter than prior art inner hose 24 and thus will tend to bind more easily with outer cover 26. A bonding interface material 33 and/or 33a can be used to securely bond rings 34 and 34a to outer cover 26 if needed. As with hose 30, multiple bonding methods can be used to attach the wear rings to the outer cover. In the case for wear ring 34a, friction might be sufficient to hold it in place, but additional bonding can insure stable positioning of the wear rings. Wear rings 34 are designed to substantially fit around outer cover 26 at its natural diameter. Wear ring 34a shows an alternative wear ring placement where the diameter of wear ring 34a is smaller than the natural diameter of cover 26 so that cover 26 is indented at the location of wear ring 34a. Cover 26 can be woven with this smaller diameter so that wear ring 34a fits naturally in the ring-shaped indention (ring-shaped valley). This ring shaped indention can provide a narrowed contact surface portion 35a on inner surface 45 of cover 26 that can hold inner hose 44 in position during use. Friction contact can be sufficient to hold inner hose 44 in position with respect to cover 26 during use. Inner hose 44 can adjust its position with respect to outer cover 26 to relieve differences in strain within the inner hose. The wear rings can stack next to one another as hose 40 retracts to its stowed length (retracted position). The spacing of rings 34 and 34a will depend on the needs of that particular hose. Rings 34 and 34a can be held in place by bonding materials 33 and 33a, respectfully, which can be the same as bonding material 31 seen in FIG. 2A. Wear rings 34 and 34a can be formed in a number of ways. Rings 34 and 34a might be injection molded prior to being bonded to cover 26, either as a complete ring or two or more bondable segments. The rings can also be injection molded or extruded onto cover 26 to thermally bond rings 34, 34a or 36 (see FIG. 2C) to cover 26. Other methods can also be used to manufacture and bond rings 34, 34a, and 36 to outer cover 26.

In FIGS. 2A and C, retractable stretch hoses which rely on an inner elastic tube 24 having a natural outside diameter of approximately half of the inside diameter of the outer cover 26 to provide retracting force are shown. In this type of configuration, if elastic hose 24 has an natural outside diameter that is half the inside diameter of outer cover 26 when expanded (see FIG. 1B), then half of the latex's elastic elongation is used up expanding radially from the outside diameter of elastic tube 24 to the inside diameter of outer cover 26, and only 375% elongation remains for elastic tube 24 to stretch in the longitudinally direction. To maintain a small safety margin, the hoses are generally not stretched longitudinally more than 300% (200% radial times 300% longitudinal=600% total elongation). However, if the diameter of the inner elastic hose 24 were increased to near the inside diameter of outer cover 26 (see FIGS. 2B, 3B-C, and 4A-D), then this larger diameter elastic hose would not undergo significant radial expansion when pressurized, and nearly all its 750% elongation can be used to extend the retractable hose longitudinally. If the inner elastic hose is made with a diameter greater than the inside diameter of the outer cover, the elastic hose can actually contract radially when stretched, thereby allowing even greater longitudinal extension ratios. Such an inner elastic hose that has a diameter larger than the diameter of the outer cover can be folded lengthwise to reduce its size and then pulled through the outer cover to construct the hose. Tests with these large diameter inner elastic tubes showed that 6× extension hoses (extended length six times their collapsed length) were easily achievable using an inner hose made up of natural latex can having a maximum elongation of approximately 750 percent (7.5 to 1). It was also noticed that the large diameter elastic hoses tested folded radially (forming a lengthwise fold) to allow the elastic hose to collapse radially and allow the hose cover to be retracted (longitudinally collapsed). That is, the collapsing of the outer cover tended to push and fold the large diameter inner elastic hoses inward to make room for the folds of the outer reinforcement cover. Tests conducted with inner elastic tubes that had a larger diameter than the interior diameter of the outer cover showed no difficulties in retracting and folding the outer cover to its collapsed length at 6× extension ratios (longitudinal expansion ratio). In all tests with inner elastic tubes larger than the outer cover diameter using household water pressure, the hoses extended and retracted (collapsed) with an extension ratio of approximately six-to-one when pressurized and appeared to have very little problem retracting even though the inner elastic tubes needed to compress radially to fully retract.

In FIGS. 3A through 4D, we will see various retractable hoses with inner elastic tube that are shown with diameters that are approximately equal to or slightly less than the inside diameter of cover 26. Inner elastic hoses 44, 64, 74, 84 and 104 are only shown with a diameter that is equal or slightly less than the inside diameter of cover 26, because of the difficulty in actually drawing an inner elastic tube that has a diameter larger than the inside diameter of cover 26 (elastic tube must be folded radially). However, the reader should understand that inner elastic hoses 44, 64, 74, 84, and 104 can have an outside diameter greater than inside diameter or even outside diameter of its respective outer cover 26. The increase in extendibility of the retractable hoses results from the inner elastic tube having an outside diameter that is greater than about sixty percent (60%), about sixty-five percent (65%), about seventy percent (70%), about seventy-five percent (75%), about eighty percent (80%), about ninety percent (90%), about ninety-five percent (95%), about one hundred percent (100%), and/or about one hundred five percent (105%) of the inside diameter D2 and/or outside diameter D3 of outer cover 26. In some embodiments, the increase in extendibility of the retractable hoses results from the inner elastic tube having an outside diameter that is less than about one hundred and twenty-five percent (125%), and/or less than about one hundred twenty percent (120%). It is to be understood that in some embodiments, the increase in extendibility of the retractable hoses results from the inner elastic tube having an outside diameter that is from about sixty percent (60%) to about one hundred and twenty-five percent (125%), from about sixty percent (60%) to about one hundred (100%), from about sixty percent (60%) to about eighty percent (80%), and/or from about sixty-five percent (65%) to about seventy-five percent (75%).

It is the relationship between the diameters of the elastic tube and its outer cover that mostly determines the maximum extension ratio of that particular retractable hose. The larger the elastic tube diameter is compared to the outer cover diameter, the greater the extension ratio can be (up to a limit determined by the elasticity of the elastic tube which varies widely depending on the elastic material used).

Figure 2C:
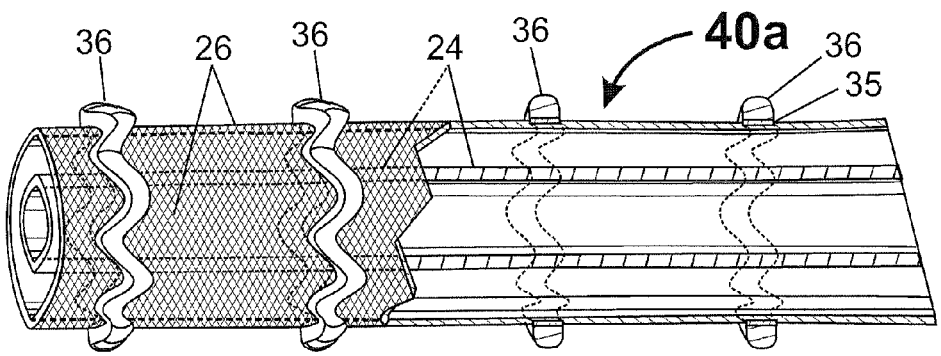
FIG. 2C Elastic stretch hose with wavy annular (ring shaped) wear ridge protectors.

In FIG. 2C, we see a perspective section view of retractable pressure hose 40a, comprising an elastic inner hose 24, an outer cover 26, wavy wear rings 36 and a bonding material 35. Construction of hose 40a is very similar to hose 40 except wavy rings 36 are used instead of straight wear rings 34 and 34a. The wavy rings 36 present more wear surface area and can be less likely to get caught on objects in a typical home yard environment. A plurality of wavy wear rings 36 are bonded periodically along the length of hose 40a. Bonding material 35 is only needed if wear rings 36 cannot be directly bonded to outer cover 26. Wavy rings 36 would be bonded in such a way that they tend to stack when hose 40a is compressed by elastic inner hose 24, so that a large length difference exists between the retractable hoses retracted length (stowed) and its extended length (pressurized).

Figure 3A:
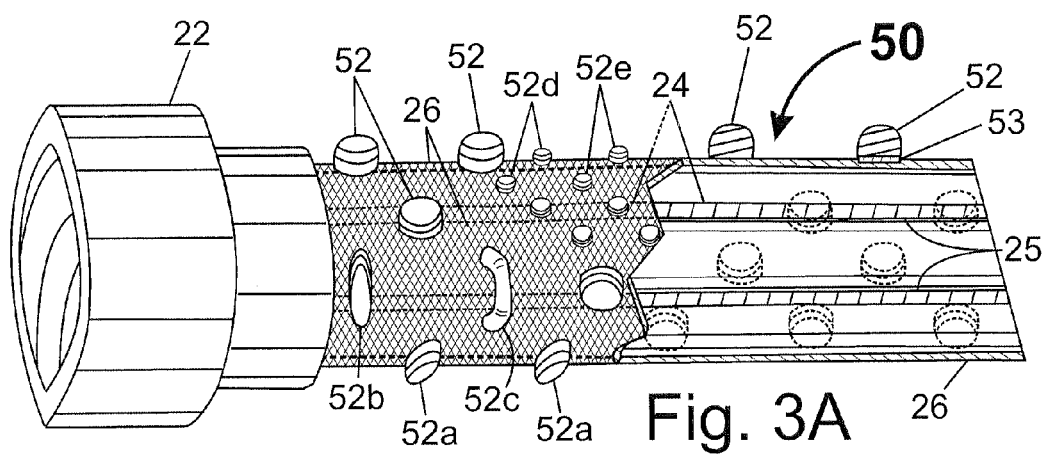
FIG. 3A Elastic stretch hose with button, oval, and protrusion wear protectors.

In FIG. 3A, we see a perspective section view of retractable stretch hose 50 (retractable pressure hose), comprising an elastic inner hose 24, an outer cover 26, an inlet connector 22, and a plurality (multiplicity) of wear resistant structures 52, and 52a-c. Besides wear resistant buttons 52, alternative localized wear resistant structures 52a, 52b, 52c, 52d, and 52e are shown. Buttons 52 and these other localized wear structures can be made of wear resistant materials to prevent contact of outer cover 26 with the ground or other abrasive surfaces. The spacing between buttons 52 is wide enough to allow hose 50 to retract into its stowed position, while also protecting outer cover 26 from abrasion, such as, contact with concrete, brick, rocks, etc. Localized wear structures 52, 52a, 52b, 52c, 52d, and 52e can be bonded onto outer cover 26 right after it is woven or in a separate process. The wear buttons can be extruded or injection molded and bonded to cover 26 by any prior art method(s) available. A bonding layer 53 can be used to bond the wear structures to outer cover 26 if needed. In manufacturing, wear structures 52 and 52a-e can be injection molded or extruded onto cover 26. With hot plastic extruders, wear structures 52 and 52a-e can be extruded onto cover 26; much like cake icing is dabbed onto a cake. The equivalent of an industrial hot glue gun can be used, for melting wear resistant plastics onto outer cover 26. Such extrusion systems can oscillate back and forth to move with outer cover 26 as it is being woven, and dab on wear resistant structures as the extrusion system moves with cover 26.

Figure 3B:
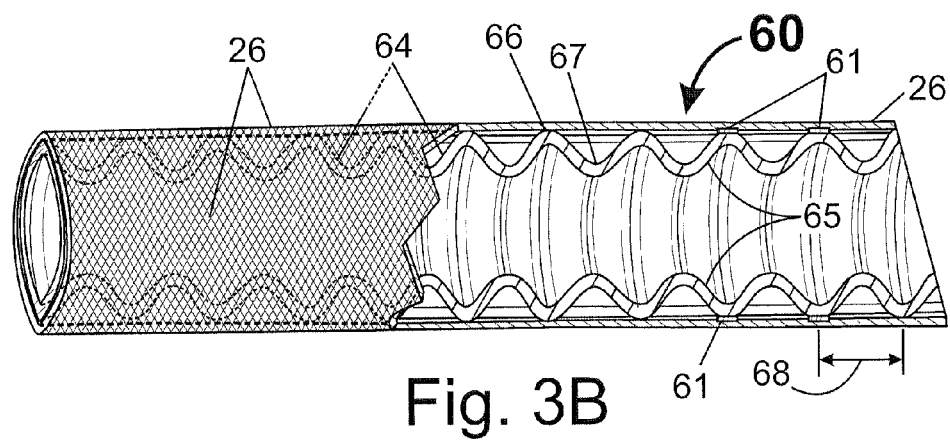
FIG. 3B Elastic stretch hose with corrugated elastic inner hose in snug contact with reinforcement cover when unpressurized.

In FIG. 3B, we see a perspective section view of retractable pressure hose 60, comprising an elastic inner hose 64, and an outer cover 26. Retractable hose 60, as with other hoses disclosed in this disclosure, can be bonded to connector ends 22 and 28, or similar ends, to provide a usable garden hose. Other styles of connector ends similar to ends 22 and 28 can be connected to allow the disclosed retractable hoses to be used as a compressed air hose, a fire hose, an industrial hose, a commercial hose, a medical hose, or other type of hose. Inner hose 64 defines a plurality of ridges 66, a plurality of valleys 67, and an interior surface 65. Inner hose 64 defines a ridge pitch 68, which is the distance between adjacent ridges. Ridge pitch 68 can be selected for the particular needs of a particular retractable hose. Inner hose 64 can be made of an elastic material that can substantially return to its original state after being stretched (e.g. a thermal set elastomer. Inner hose 64 has an outside diameter defined at the crest of ridges 66 in its relaxed state (natural state), that is greater than the diameter of the interior surface of outer cover 26, so that, the inner hose 64 fits snugly against the interior of outer cover 26. This contact between ridges 66 and outer cover 26 provides periodic points along the retractable hose that tend to hold inner hose 64 in place during use and also when retracted. This tends to maintain the length of outer cover material between adjacent ridges of inner hose 64 and thus controls the amount of stretch (strain) experienced by a particular section of inner hose 64. In alternative designs ridges 66 can be bonded to outer cover by any of a number of methods, such as, using a flexible adhesive 61 to bond ridges 66 to cover 26 and/or by thermally bonding ridges 66 to cover 26. Many other bonding methods can be used to bond ridges 66 to cover 26. These bonding methods can include using materials and/or coatings on cover 26 that have a high friction coefficient with the exterior surface of inner hose 64 to substantially lock the inner hose in place. Flexible adhesive 61 can also comprise a microwave absorbing adhesive.

In some embodiments, the outer surface of the inner elastic hose is frictionally engaged with the interior surface of the outer cover of the hose, particularly when the hose is in its extended position. In these and other embodiments, the interior surface of the outer cover of the hose, and/or the outer surface of the inner elastic hose may comprise a coating providing a friction coefficient between the inner elastic hose and the outer cover, wherein the friction coefficient is greater than about 0.5, or greater than about 0.7. In some embodiments, the friction coefficient may be greater than about 1.0. In some embodiments, the friction coefficient may be in range of about 0.5 to about 1.0, and/or from about 0.5 to about 0.7.

In FIG. 3B, the corrugated nature of elastic inner hose 64 provides another advantage over prior art, in that, the corrugated shape allows hose 64 to extend longitudinally about two times its natural length before large amounts of strain begin to occur in the elastic material that comprises inner hose 64. This allows retractable hose 60 to extend to a much greater length than other prior elastic-biased retractable hoses. Also, the increased diameter of inner hose 64 over prior art elastic-biased retractable hoses, means that it needs to stretch less radially when pressurized. The reduction radial stretching leaves more of the elastic ability of inner hose 64 to be used for longitudinal stretching instead of being wasted on radial stretching. Thus, hose 60 can have significantly larger stretch ratios than prior art hoses, and a five-to-one stretch ratio, or greater, is achievable with this design. Prior art elastic-biased retractable hoses are limited to around three-to-one stretch ratios because of the limits of present day elastic materials and the diameter of their interior hose.

Figure 3C:
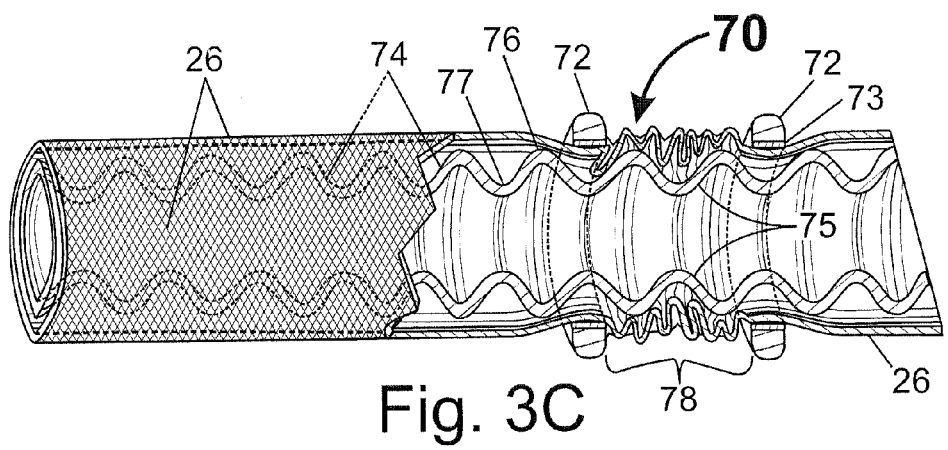
FIG. 3C Elastic stretch hose with corrugated elastic inner hose. Elastic hose designed with a smaller diameter than interior of reinforcement cover.

In FIG. 3C, we see a perspective section view of retractable stretch hose 70 (retractable pressure hose), comprising an elastic inner hose 74, an outer cover 26, and a plurality of wear rings 72. Inner hose 74 defines a plurality of circular ridges 76 and a plurality of valleys 77 along its length and an interior surface 75. Retractable hose 70 may also comprise wear resistant structures like wear rings 72 to prevent outer cover 26 from being damaged. Wear rings 72 can be bonded to outer cover 26 with bonding material 73 if needed. Bonding material 73 can be any of a number of adhesives or polymers that can bond rings 72 to outer cover 26. Inner hose 74 can be made of an elastic material that can substantially return to its natural state after being stretched. The use of a thermoset (thermal set) or crystalline elastomer for inner hose 74 can provide a more stable retracting ability for the hose. Inner hose 74 has an outside diameter at its ridges 76 in its relaxed state (natural state) that is less than the natural diameter of the interior surface of outer cover 26. This arrangement allows inner hose 64 the ability slide longitudinally within outer cover 26 when not pressurized (unpressurized), and thus can be self adjusting if outer cover somehow gets improperly positioned. Inner hose 74 can be made only slightly smaller in diameter than the interior surface of the outer cover 26 so that as soon as pressure is applied to inner hose 74, ridges 76 are pressed against outer cover 26, securing them in place. Later as pressure increases, valleys 77 also stretch and contact outer cover 26. In alternative designs, the diameter of ridges 76 can be made with a natural diameter substantially equal with the natural inside diameter of cover 26. As we will see in FIG. 4A, this configuration, where the inner hose ridges have a smaller natural diameter than the interior surface of the outer cover, can allow the inner hose to be bonded to the outer cover 26 and provide periodic securing points that lock the inner hose in position with respect to outer cover 26. Wear rings 72 can be bonded to outer cover 26 using nearly any bonding method, including, but not limited to, thermal bonding, chemical bonding, use of adhesive bonding materials, or other bonding materials.

Figure 4A:
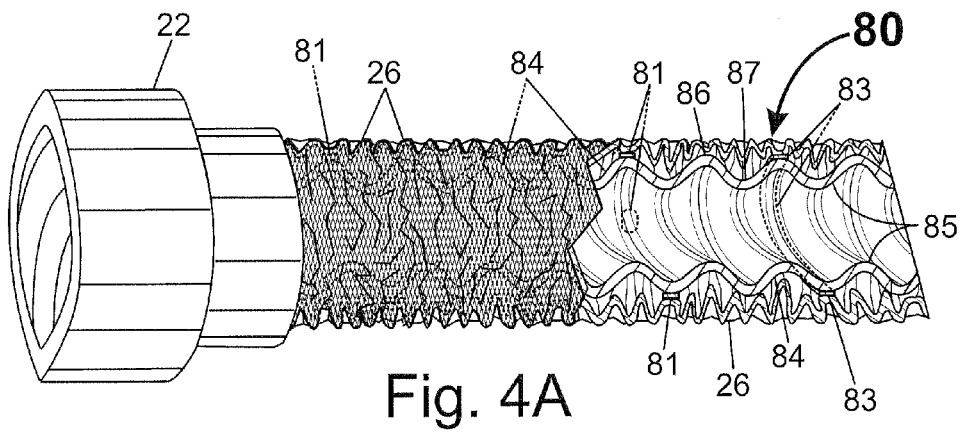
FIG. 4A Elastic stretch hose with convoluted elastic inner hose with periodic bonding of the inner hose to the outer reinforcement cover.

In FIG. 3C, wear rings 72 are designed to slightly constrict the diameter of outer cover 26, while at the same time protruding radially to a diameter significantly larger than the outside diameter of cover 26. This constriction can be woven into outer cover 26 by reducing the diameter of the radial yarn(s) used in that section. Wear rings 72 can fit within these constricted portions (reduced diameter portions) of outer cover 26 to help force the interior of cover 26 into valleys 77 between ridges 76. This tends to lock outer cover 26 in place with relationship to ridges 76 on inner hose 74. In FIG. 3C, elastic inner hose 74 is shown in its relaxed state while outer cover 26 is shown in its stretched out and pressurized shape (except in section 78 where it is in a retracted or stowed position). The reader should understand that these two positions or states never occur together in an actual hose, and are shown here to show the reader the natural shape of inner hose 74 and outer cover 26 at the same time. When unpressurized hose 70 can appear as it does in section 78. When pressurized, both inner layer 24 and outer layer 26 will be pressed flat against one another and appear similar to retractable hose 20 seen in FIG. 1B. When pressure is removed and hose 70 retracts, outer cover 26 would fold and crumple as inner hose 74 returns to its relaxed state as seen in section 78 between wear rings 72 in FIG. 3C. Both outer cover 26 and inner hose 74 are shown in section 78 in their retracted and relaxed states and how outer cover 26 might fold when hose 70 is retracted (FIG. 4A shows retractable hose 80 in a similar state). When pressurized, both outer cover 26 and inner hose 74 will extend longitudinally until outer cover 26 is fully expanded. The length of cover 26 material between rings 72 can be chosen for each particular retractable hose. For this example, hose 70 can expand longitudinally approximately four times its retracted length shown in section 78.

Figure 4B:
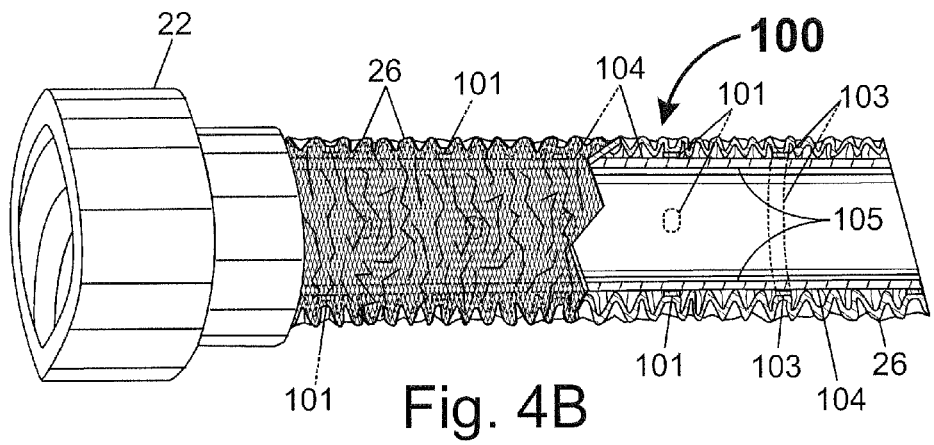
FIG. 4B Elastic stretch hose with enlarged straight elastic inner hose bonded periodically to the outer reinforcement.

In FIGS. 4A and 4B, the wear resistant protection structures seen in FIGS. 2A through 3A, and 3C are not shown to keep the drawing uncluttered, but similar wear protection can be used with either of these retractable hose examples. Both examples, show outer cover 26 and inner hoses 84 and 104 in their retracted and relaxed position or state. When pressurized, both retractable hose examples 80 and 100 would appear similar to pressurized retractable hose 20 seen in FIG. 1B. However, in their retracted, unpressurized state, one can see they have very different construction.

In FIG. 4A, we see a perspective section-view of retractable pressure hose 80, comprising an elastic inner hose 84, an outer cover 26, and optional bonding pads 81 and/or optional bonding strip 83. Inner hose 84 is convoluted in shape and comprises a single spiral ridge 86 and a single spiral valley 87 that follow each other along the length of the hose. Inner hose 84 also comprises an interior channel 85 for conveying fluids or gases entering through input connector 22 and exiting the other end of retractable hose 80 which can include a flow restricting end similar to output connector 28. Inner hose 84 can just as easily be a corrugated hose like inner hose 74 and provide substantially the same operational characteristics. If inner hose 74 were used, optional bonding strip 83 could be replaced with a plurality of bonding rings similar to bonding rings 103 seen in FIG. 4B. Inner hose 84 can comprise an outside diameter for ridge 86 which is chosen so that during extending, retracting and folding of outer cover 26, its position tends not to slip out of positions with respect to inner hose 84. This design helps keep a predetermined amount of folded outer cover 26 between adjacent coil of ridge 86, and helps prevent over stretching of any particular section of inner hose 84. This stabilizing of the position of outer cover 26, allows inner hose 84 to have a significantly larger diameter than prior art inner hose 24. This larger diameter reduces the radial strain in inner hose 84, which tends to increase its ability to stretch in the longitudinal direction. Further, the convoluted nature of elastic inner hose 84, similar to corrugated inner hose 74, can provide nearly double the elongation before reaching breaking strain compared to straight elastic hoses like inner hose 24.

In FIG. 4A, bonding pads 81 and bonding strip 83 are two examples that can be used to further lock outer cover 26 in position with respect to inner hose 84. To insure that outer cover 26 does not slowly work its way out of position, or that the user moves cover 26 out of position while stowed, these bonding systems can be used to bond inner hose 84 to outer cover 26. Bonding systems 81 and 83 can comprise a soft flexible adhesive and/or polymer that strongly bonds to both inner hose 84 and outer cover 26. Such a bonding system might comprise a soft flexible layer that allows inner hose 84 to easily stretch when pressurized to reduce strain in the bonded area. Bonding systems 81 and 83 might also comprise a low temperature flexible glue that can be melted and bonded to both outer cover 26 and inner hose 84. The thickness of bonding systems 81 and 83 can be thicker than shown in FIGS. 4A-B to provide strain relief between elastic inner hose 84 and reinforced outer cover 26. If heat is used as an activator for an adhesive, polymer, and/or glue, the heat applied must be of low enough temperature and/or for a short enough time duration that neither inner hose 84 nor outer cover 26 is damaged by the heat. Bonding systems 81 and 83 (patch and strip) can also comprise a microwave absorbing adhesive. Alternatively, a multilayer bonding systems can be used with this hose design and the other hose designs presented in this disclosure. With a two layer bonding system each layer would strongly bond to its respective component of the hose (inner hose 84 or outer cover 26) and would also bond strongly to each other (see FIG. 4D). This two component bonding method can have one component applied to the interior surface of outer cover 26, and the other component applied to the ridges of elastic inner hose. A two component bonding method could also comprise a preformed spacer that has the appropriate adhesive on each side of the spacer so that the spacer bonds to both the outer cover and the inner hose, and also provides the flexibility needed to stretch with the inner hose. Such a bonding space can use the same bonding agent on both sides if such a bonding agent exists that bonds strongly to both inner hose 84 and outer cover 26.

In FIG. 4A, inner hose 84 is convoluted, which means that it has a spiral, or cork-screw shape. At first glance hose 84 can look corrugated like inner hose 74, however, hose 84 tends to produce small twisting forces in the hose. For this reason, a corrugated inner hose like hose 74 is preferred, but a convoluted inner hose still works in this application.

In FIG. 4B, we see a perspective section-view of retractable pressure hose 100, comprising an elastic inner hose 104, an outer cover 26, and optional bonding pads 101 and/or optional bonding rings 103. Inner hose 104 comprises an elastic cylindrical tube for providing a retracting force to hose 100 and for conveying fluids or gases entering from input connector 22 and flowing to the other end of retractable hose 100 which can have attached a flow restrictor (flow restricting device), or flow restrictor connector, similar to connector 28.

Inner hose 104 has an interior channel 105 for conducting gasses and liquids and can be very similar to elastic inner hose 44 seen in FIG. 2B. Because inner hose 104 is periodically bonded to outer cover 26, the relative diameter of inner hose 104 can be larger and its wall thickness thinner than prior art elastic hose designs. Both of these improvements are possible because of stabilizing the inner hose against the outer cover with periodic bonding. This periodic bonding of inner hose 104 to outer cover 26 greatly reduces the maximum frictional forces that can be created against inner hose 104, and thus reduces the strain in inner hose 104. Because the binding or frictional forces of hose 104 against cover 26 is much less of a problem with periodic bonding, and the diameter of hose 104 can be increased to further reduce the overall strain within elastic inner hose 104 for the same longitudinal extension ratio. Also, because of these lower frictional stresses, inner hose 104 can be made much thinner than prior art elastic stretch hoses, and thus reduce the total retracting force on stretch hose 100.

In FIG. 4B, the result of these improvements allows this design to use a significantly thinner walled inner hose 104, which can reduce the retracting force on retractable hose 100 and allow extending and retracting with a more ergonomic water pressure differential. Prior art elastic hoses, use relatively thick walled hoses because of the large longitudinal stresses they must endure because of the large frictional forces that can be created against outer cover 26 (i.e. outer cover gets longitudinally out of place). The thicker walls of the prior art inner hoses also means a larger internal pressure must be reached before the inner hose can press up against the outer cover and generate significant friction with the outer cover. Because prior art inner hoses are free to slide around within the outer cover when not pressurized, the outer cover can generate significant friction forces on the inner hose over long distances and place considerable stress on the inner elastic hose. To survive this high stress situation, the prior art inner hoses need to be relatively robust and wall thicknesses are large. The disclosed retractable hose 100, significantly reduces these problems, and inner hose 104 can have nearly the same diameter as outer cover 26 while still provide small maximum frictional forces. The larger diameter of inner hose 104 means a large portion of the radial strain is eliminated from the inner hose, leaving more inner hose elasticity for longitudinal elongation. Thus, larger diameter inner hoses like inner hose 104 can provide greater longitudinal extension ratios than prior art elastically biased hoses. Further, prototypes built using larger diameter elastic inner hoses similar in size to hoses 44, 104 and 104a have displayed longitudinal expansion ratios greater than five-to-one and even six-to-one. This larger diameter, however does tend to increase friction with outer cover 26, because inner hose 104 is more quickly pressed against outer cover 26 by internal pressure. However, because of the close spacing of the periodic bonding systems 101 and/or 103 there is no large distances over which to generate large frictional forces, and thus inner hose 104 does not need to have thick walls to overcome this friction. These frictional forces are kept small in retractable hose 100 because any misalignment of outer cover 26 only exists over the short distance between adjacent bonding structures (bonding pads 101 and rings 103). In other words, only small amounts of friction can be generated between hose 104 and cover 26 over the short distances between bonded areas or zones. Thus, inner hose 104 can be made much thinner than prior art hoses because the maximum friction stress between inner hose 104 and outer cover 26 is greatly reduced and is less likely to damage the inner hose. Reducing the wall thickness of inner hose 104 also provides the benefit of reducing the retracting force on retractable hose 100. Prior art hoses at full extension provide considerable retracting biasing from their inner elastic hose which is stretched almost to its breaking point. This strong biasing requires the internal pressure within these prior art retractable hoses to be relatively high, which makes using the hose in low-flow or low-pressure situations difficult. It also makes it difficult to use with sprinklers that must be placed out in the middle of the lawn before turning on the water supply. By using a thinner walled elastic inner hose 104 the retractable hose's biasing force can be reduced to make it easier for the user to control the hose.

Figure 4C:
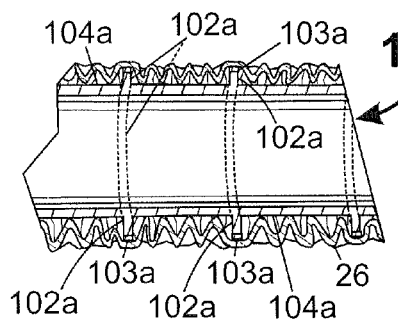
FIG. 4C Elastic stretch hose comprising an enlarged straight elastic inner hose with periodic bonding ridges along its surface.

In FIG. 4C, we see a section-view of retractable pressure hose 100a, comprising an elastic inner hose 104a, an outer cover 26, a plurality of bonding ridges 102a, and a plurality of optional bonding adhesive rings 103a. Retractable hose 100a can be substantially the same as retractable hose 100, except for the bonding ridges 102a protruding from the exterior surface of elastic inner hose 104a. Bonding ridges 102a extend away from the surface of inner hose 104a to provide separation of the gripping or bonding surface at adhesive rings 103a from the elastically stretched body portion of inner hose 104a. If adhesive rings 103a are not used, bonding ridges 102a act as friction ridges that tend to hold inner hose 104a in position with respect to outer cover 26 during repeated extensions and retractions. When bonding ridges 102a are bonded to outer cover 26 the bonding ridges help reduce forces on adhesive rings 103a during stretching. Since inner hose 104a might stretch three or more times its relaxed length, separating this stretching portion of inner hose 104a from adhesive rings 103a with protruding bonding ridges 102a help prevent the bonding of rings 103a from being over stressed. Bonding ridges 102a also provide a narrow contact surface for adhesive 103a to be applied on during manufacturing, which can reduce the portion of outer cover 26 that is bonded in position relative to inner hose 104a and cannot significantly fold or crumple during retraction of the hose. Bonding ridges 102a can be manufactured as part of elastic inner hose 104a as shown, or comprise a bonded structure on an inner elastic hose similar to inner hose 104. Bonding ridges, like bonding ridge rings 102a, can also be added to other inner hoses designs disclosed within this disclosure. For example, convoluted inner hose 84 can have a similar bonding ridge defined on the top of its spiral ridge 86 to help secure it to outer cover 26. Similarly, corrugated inner hoses 64 and 74 can define a bonding ridge rings similar to bonding ridges 102a at each ridge 66 and 76, respectively, to help secure them to their outer cover 26. Finally, similar bonding ridges can be added to smaller diameter inner hose 44 to help bond and/or stabilize the position of inner hose 44 to outer cover 26.

Figure 4D:
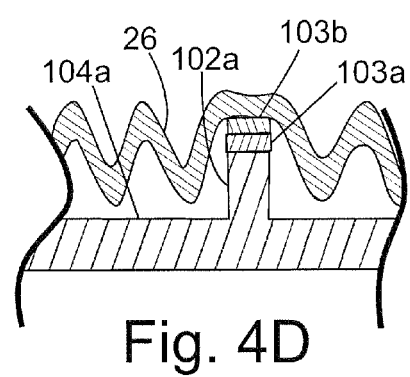
FIG. 4D Close-up section-view of elastic stretch hose 100a with microwave absorbing adhesive.

In FIG. 4D, we see a close-up section-view of retractable pressure hose 100a, further including a microwave absorbing adhesive ring 103b. This alternative bonding method uses two adhesives layers (103a-b) to secure inner hose 104a to outer cover 26. This method can be used when bonding dissimilar materials that are difficult to bond with a single adhesive. Each adhesive bonds well to its particular material, with adhesive 103a bonding securely to elastic tube 104a and adhesive 103b bonding securely to outer cover 26. Adhesives 103a-b are further designed to bond securely to each other outer cover 26 can be securely bonded to inner elastic hose 104a. Bonding adhesive ring 103a can comprise a first adhesive (or polymer) that bonds strongly to the elastomer comprising bonding ridge 102a, and a second microwave absorbing adhesive 103b that bonds strongly to first adhesive 103a and also to outer cover 26 when heated. In this way, outer cover 26 can comprise a significantly dissimilar material and yet still be bonded to inner hose 104a. This use of microwave absorbing adhesives can be used to bond together components of other retractable hoses and wear structures disclosed in this disclosure.

Figure 5A:
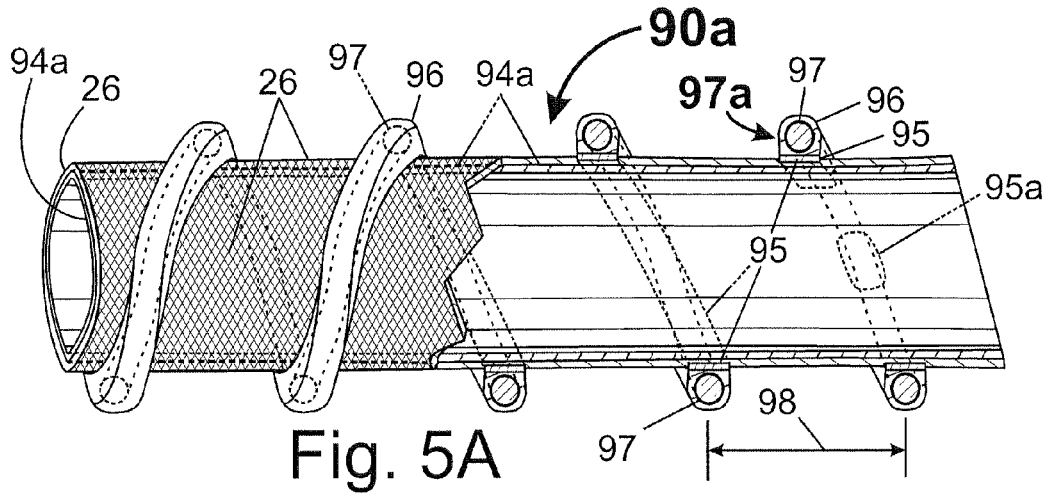
FIG. 5A Perspective section view of a spring coil biased stretch hose with a cylindrical woven reinforcement cover and a cylindrical inner hose substantially bonded to each other.
Figure 5B:
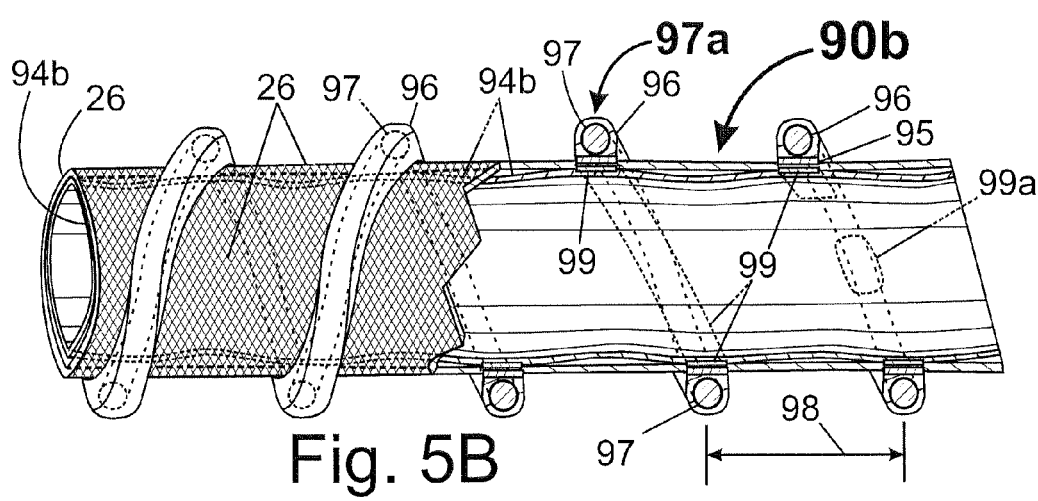
FIG. 5B Perspective section view of a spring coil biased stretch hose with woven cover and a cylindrical inner hose bonded to each other along a helical path.
Figure 5C:
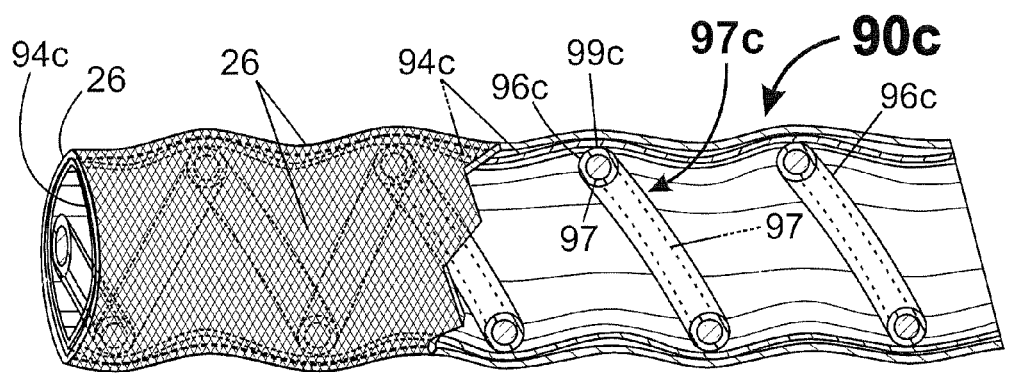
FIG. 5C Perspective section view of a stretch hose with interior mounted spring biasing.

In FIGS. 5A through 5C, we see perspective section-view of cylindrical retractable pressure hoses 90a-c, respectively. Each of these retractable hoses use a biasing wire coil 97a or 97c to provide the retracting force needed to crumple and compress inner hoses 94a⇔c and outer cover 26 of their respective retractable hose. By using a wire coil biasing means 97a or 97c, as shown in these drawings, several problems are eliminated. First, the problem of the elastic limit of the inner hose material is eliminated because inner hoses 94a-c no longer need to stretch significantly, but only fold-up or collapse longitudinally. Second, the high stresses previously placed on the inner hose are gone and inner hoses 94a-c need only support internal pressure against the interior of outer cover 26. Third, inner hose 94a eliminates frictional forces against outer cover 26 by being bonded completely to outer cover 26. Inner hoses 94b-c can greatly reduce frictional forces since they can fold along with outer cover 26. Fourth, the overly strong biasing provided by the prior art elastic retractable hoses is eliminated because the retracting force comes from a coiled wire springs which can more easily be reduced than for elastic-biased designs. Fifth, the wire coil springs 97a and 97c have a stable biasing that does not significantly degrade over time. Elastic biased hoses can lose a significant percentage of their ability to retract (loss of elasticity) if left pressurized or extended for extended periods of time, or left extended in the hot sun for shorter periods of time. In all three of these retractable hose examples, outer cover 26 and inner hoses 94a-c, each must be made thin enough (small enough wall thickness) to allow the inner hose and outer cover to crumple longitudinally similar to outer cover 26 seen in FIGS. 4A-B. Inner hoses 94a-c can be designed to fold and crumple with outer cover 26.

In FIG. 5A, we see perspective section-view of cylindrical retractable pressure hose 90a, comprising a flexible inner hose 94a, an outer cover 26, a wire coil 97a, (wire 97 and protective wear cover 96), and an optional bonding strip 95 and/or optional bonding patches 95a. Wire coil 97a forms a continuous coil around outer cover 26 along the length of hose 90a with a coil pitch 98. Coil 97a can be made from any resilient metal or metal-like material, that can act as a spring. Common materials for wire 97 can comprise, spring steel, stainless steel, high carbon steel, piano wire, etc. Wear cover coating 96, on the exterior of wire 97, can be made from a highly wear resistant material that provides protection for wire 97 from both the environment (water, chemicals, solar radiation UV, etc.) and from wear caused by physical contact with the ground or other objects. Wear cover 96 also protects retractable hose 90a from surface wear. Wear cover 96, encloses biasing wire 97, and can be thermally bonded to the exterior of outer cover 26 if these two components are made of materials that can be thermal bonded directly to each other. If cover 26 and wear cover 96 are not compatible for bonding directly to each other, then alternate bonding material(s) can be applied between wear coating 96 and outer cover 26 to form a bonding strip 95 along wire coil 97a that coils around cover 26 and holds wire coil 97a in place against cover 26. In a preferred design bonding strip 95 can comprise intermittent patches of bonding material, where wire wear coating 96 is bonded to outer cover 26 at a plurality of bonding patches 95a along the length of wear coating 96. A sufficient number of bonding patches 95a should be used so that wire 97 and wear cover 96 cannot easily be torn away from outer cover 26.

In FIG. 5A, flexible inner hose 94a comprises a flexible cylindrical tube for conveying fluids and/or gases through retractable hose 90a under pressure. In previous examples, the inner hoses 24, 44, 64, 74, 84, and 104 needed to be highly elastic to repeatedly provide the biasing force needed to retract their respective hose. However, inner hoses 94a-c just need to be flexible and durable enough to repeatedly crumple and fold when their retractable hose retracts. Inner hose 94a can be composed of nearly any strong, and flexible polymer, elastomer, or other material, that is both flexible enough to fold and crumple repeatedly with outer cover 26 and still remain water-tight and/or air-tight. Outer cover 26 and inner hose 94a are flexible enough that they can be compressed (crumpled) longitudinally by the biasing force of wire 97 to a retracted state between the coils of wire 97a. Inner hose 94a is bonded to the interior wall of outer cover 26 across its entire surface in this example. This bonding between hose 94a and cover 26 can be weak since the forces (internal pressure) operating on these cylindrical components is perpendicular to their contact surface. Thus, inner hose 94a might be weakly bonded to the outer fibers on the interior surface of cover 26. Because of this weak bonding, some sections of the inner hose 94a might pull away (de-bond) from the outer cover 26 during repeated retraction and extension of outer cover 26. This pulling away, or debonding, of small areas of inner hose 94a from outer hose 26 is allowable as long as sufficient bonding remains between hose 94a and cover 26 to keep inner hose 94a from being damaged by the repeated extension and retraction of hose 90a. In alternate designs, inner hose 94a can be bonded and/or infused deep into the interior surface of cover 26 so that these two components are strongly bond, and/or provide very little debonding between hose 94a and cover 26 during repeated use of retractable hose 90a.

In FIG. 5B, we see perspective section-view of cylindrical retractable pressure hose 90b, comprising a flexible inner hose 94b, an outer cover 26, a coiled wire 97a (wire 97, and wear cover 96), bonding strip 95, and an optional bonding strip 99 and/or optional bonding patches 99a. Retractable hose 90b is very similar to retractable hose 90a except for the way inner hose 94b is bonded at specific bonding locations to outer cover 26. These bonding locations can comprise a spiral bond strip 99, a plurality of bonding patches 99a positioned under wire coil 97a, or a plurality of bonding patches 99a in other bonding zone configurations. Inner hose 94b can be bonded to cover 26 by a large number of means including, thermal bonding, adhesive bonding, mechanical bonding, etc. With thermal bonding, inner hose 94b can be bonded to the inside of outer cover 26 at the same time as wear cover 96 is hot bonded to the outside of cover 26. Thus, the heat used to bond wire cover 96 can be used, at least in part, to thermally bond inner hose 94b to outer cover 26. In alternative bonding configurations, inner hose 94b can be bonded to outer cover 26 by a bonding patches 99a that can be mounted to either inner hose 94b or outer cover 26 prior to assembly. Where bonding patches 99a can comprise an adhesive, thermal polymer, or other material that can bond hose 94b and cover 26 together after assembly.

In FIG. 5B, wire coil 97a forms a continuous coil around outer cover 26 along the length of hose 90b, and can be made from many resilient metals or other strong elastic material, that can act as a spring. Wear cover 96 encloses biasing wire 97 and can be thermally bonded directly to the exterior of outer cover 26 if these two components are made of materials that can be bonded directly to each other. If outer cover 26 and wear cover 96 are not compatible for direct bonding, then alternate bonding material(s) can be laid between wear coating 96 and outer cover 26 to form a bonding strip 95 (see FIG. 6B) along wire coil 97a that coils around cover 26 and holds wire coil 97a in place against cover 26. In a preferred design, bonding strip 95 can comprise intermittent patches of bonding material 95a (see FIG. 5A), where wire wear coating 96 is bonded to outer cover 26 at a plurality of bonding patches 95a along the length of wear coating 96 (only one patch 95a shown in FIG. 5A). A sufficient number of bonding patches 95a should be used so that wire 97 and wear cover 96 cannot easily be torn away from outer cover 26.

In FIG. 5B, flexible inner hose 94b comprises a flexible cylindrical tube for conveying fluids and/or gases through retractable hose 90b under pressure. Inner hose 94b, does not need to be highly elastic, but does need to be flexible so that they can crumple and fold out of the way when retractable hose 90b retracts to its stowed or retracted position. Inner hose 94b can comprise nearly any strong flexible polymer, or other flexible material, that can be repeatedly folded and crumple with outer cover 26 and still remain water-tight and/or air-tight. Outer cover 26 and inner hose 94b are flexible enough that they both can be compressed (crumpled) by the biasing force of wire coil 97a to a retracted position between and inside the coils of wire 97a. Inner hose 94b is bonded to the interior wall of outer cover 26 at specific locations across its length to keep inner hose 94b from being damaged by the repeated extension and retraction of retractable hose 90b.

In FIG. 5C, we see perspective section-view of cylindrical retractable hose 90c, comprising a flexible inner hose 94c, an outer cover 26, a wire coil 97c (wire 97 and protective cover 96c), and an optional bonding strip or patch 99c. Retractable hose 90c is similar to retractable hose 90b except that wire coil 97c is positioned inside inner hose 94c. Wire coil 97c is coated with a protective coating 96c to protect it from water and chemicals flowing through inner hose 94c. Protective coating 96c can also protect inner hose 94c from damage caused by contact with wire 97. Alternatively, bonding strips like bonding strip 95, and/or bonding patches like bonding patches 95a (see FIG. 5A), can be used to bond the protective cover 96c to either inner hose 94c and/or outer cover 26. In alternate designs, wire coil 97c can be placed between inner hose 94c and outer cover 26. In such a sandwiched design, wire cover 96c can be bonded to outer cover 26 and/or inner hose 94c.

In FIG. 5C, wire coil 97c forms a continuous coil inside inner hose 94c along the length of retractable hose 90c. Wire 97 within wire coil 97c can be made from any resilient metal or other material that can act as a spring. Protective cover 96c, that encloses biasing wire 97, can be thermally bonded to inner hose 94c if the correct materials are selected for inner hose 94c and protective cover 96c. In alternate designs, wire 97 can be made of a stainless steel so that protective cover 96c is not needed. This means that inner hose 94c would not be bonded to this stainless steel wire. In alternate designs, wire 97 and cover 96c can be positioned between outer cover 26 and inner hose 94c, and can be bonded to either outer cover 26 and/or inner hose 94c. Inner hose 94c, outer cover 26 and wire cover 96c can be bonded in any combination using the previously disclosed and/or other prior art bonding methods. In this example, wire coil 97c has a natural outside diameter that is slightly larger than the natural inside diameter of outer cover 26. This causes outer cover 26 and inner hose 94c to bulge slightly where wire coil 97c presses against them. This slight pressure and shape change caused by wire coil 97c provides two advantages. First, the larger diameter of wire coil 97c presses inner hose 94c against outer cover 26 so that little or no bonding is needed between hose 94c and cover 26. Second, the deforming of outer cover 26 and inner hose 94c by wire coil 97c provides retractable hose 90c with a slightly convoluted shape that physically allows hose 94c and cover 26 to more easily crumple and fold into a longitudinally retracted position. And third, if wire coil 97c with its protective cover 96c is not bonded to either inner hose 94c and/or outer cover 26, then retractable hose 90c can more easily retract, crumple, and fold cover 26 and inner hose 94c. In other designs, wire coil 97c can have a natural outside diameter substantially equal to the natural inside diameter of outer cover 26. Since wire coil 97c is on the interior of outer cover 26, it cannot protect either cover 26 or inner hose 94c from wear damage. To protect cover 26 and inner hose 94c from damage, any of the wear protection systems shown in FIGS. 2A-C, 3A, and 3C can be used. For example, a wear strip like wear strip 32 seen in FIG. 2A can be bonded to the exterior of retractable hose 90c to provide wear protection for the hose. Wear protection rings 34, 36 and 72 can also be used, as can, wear buttons 52, and 52a-b, wear loop 52c and wear dots 52d-c.

In FIG. 5C, flexible inner hose 94c comprises a flexible cylindrical tube for conveying fluids and/or gases through retractable hose 90c under pressure. Inner hose 94c, does not need to be highly elastic, but hose 94c should be flexible enough so that it can crumple and fold out of the way when hose 90c is longitudinally collapsed (retracted). Inner hose 94c can comprise nearly any strong polymer, and/or other material(s), that are flexible enough to fold and crumple repeatedly with outer cover 26 and still remain water-tight and/or air-tight. The combination of outer cover 26 and inner hose 94c together are flexible enough that they both can be compressed (crumpled) by the biasing force of coiled wire 97 to a retracted state between the coils of wire 97c. Inner hose 94c can be bonded to the interior wall of outer cover 26 at specific locations across its surface if desired. Specifically, inner hose 94c can be bonded to cover 26 using bonding patches similar to bonding patches 99a or combined to form a continuous strip of adhesive similar to bonding strip 99 (see FIG. 5B). Inner hose 94c can also be weakly bonded, or not bonded at all, to the interior surface of cover 26 if sufficient pressure from wire coil 97c against hose 94c and cover 26 to keep inner hose 94c in place and protected from being damaged by the repeated extension and retraction of retractable hose 90c.

Figure 6A:
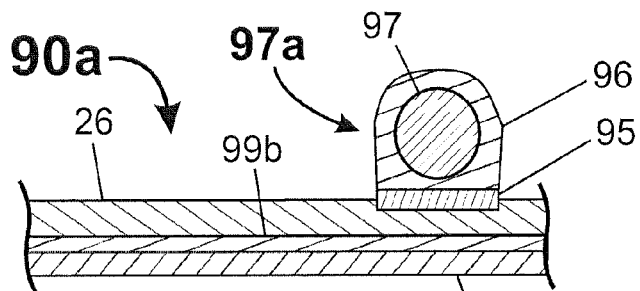
FIG. 6A Section side-view of the stretch hose seen in FIG. 5A.

In FIG. 6A, we see a closeup section-view of retractable hose 90a (first seen in FIG. 5A), comprising a flexible inner hose 94a, an outer cover 26, a wire coil 97a (wire 97 and wear cover 96), bonding strip 95, and an optional continuous bonding layer 99b. If bonding layer 99b is used, it can have very different properties than either cover 26 or inner hose 94a, and can comprise, a sheet of bonding material, a mesh of bonding material (to allow more hose flexibility during folding), a soft elastomer, a foamed polymer, etc. Because inner hose 94a is always pressed against outer cover 26 during use, a weak bond between cover 26 and inner hose 94a can be sufficient to keep inner hose 94a attached to cover 26 together without the need for bonding layer 99b. The thickness of layers 26, 94a, and 99b are exaggerated in FIG. 6A so the reader can more easily see the hose's components. In an actual retractable pressure hose, these layers can be very thin.

Figure 6B:
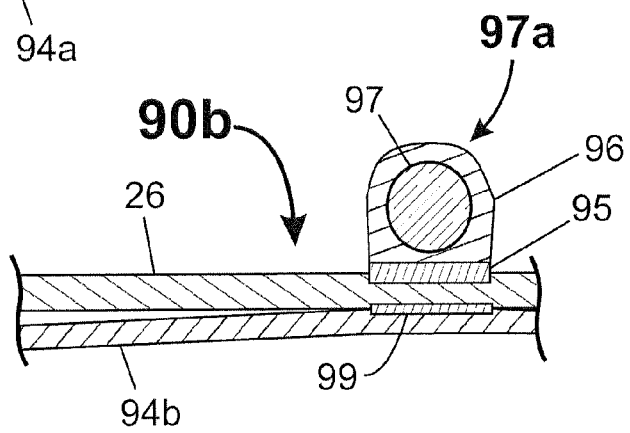
FIG. 6B Section side-view of the stretch hose seen in FIG. 5B.

In FIG. 6B, we see a closeup section-view of retractable pressure hose 90b (also seen in FIG. 5B), comprising a flexible inner hose 94b, an outer cover 26, a wire coil 97a (wire 97 and wear cover 96), and bonding adhesive strips 95 and 99. Bonding of wire coil 97a to cover 26 can comprise, a bonding strip 95, or a plurality of bonding patches 95a (see FIG. 5A) that follow under wire coil 97a. Bonding adhesive strip 99 is used to bond cover 26 and inner hose 94b together just under wire coil 97a. Bonding strip 99 can have very different physical properties than either cover 26, inner hose 94b, bonding strip 95 or bonding patches 95a and 99a (see FIG. 5A-B, respectively). The use of multiple small bonding patches 99a (see FIG. 5B) allow inner hose 94b more flexibility when folding and can allow the inner hose to retract and crumple more easily. Bonding adhesives used in bonding structures 95, 95a, 99 and 99a, as well as, other bonding structures disclosed in this disclosure can be made from materials, including, but not limited to, adhesives, polymer adhesives, UV cured adhesives, thermally cured adhesives, microwave activated adhesives or polymers, infrared activated adhesives or polymer, chemically cured adhesives, flexible thermal polymer, low durometer elastomers, foamed polymer or elastomer, etc. The thickness of layers 26, and 94b are exaggerated in FIGS. 5B and 6B so the reader can more easily see the hose's components. In an actual retractable pressure hose, layers 26 and 94a can be very thin.

In FIG. 6B, we see two bonding strip structures 95 and 99. The close proximity of bonding strips 95 and 99, combined with the porous nature of woven outer cover 26, can allow both bonding structures to be formed in one operation. Bonding strips 95 and 99 can be formed by a single bonding material that flows to both sides of outer cover 26 and thus bonding wear cover 96, outer cover 26, and inner hose 94b together. The reader should also notice that the combining of bonding structures 95 and 99 can also be done by heating protective cover 96 and causing it to flow through outer cover 26 and bond to inner hose 94b. Finally, the hose body construction (inner hose 94b, bonding strip 99, and outer cover 26) for retractable hose 90b can be the same as retractable hose 90c seen in FIG. 5C. However, for hose 90c, coiled wire 97c would be placed on the inside of inner hose 94b to provide the internal biasing (see in FIG. 5C), and a wear strip similar to wear strip 32 (see FIG. 2A) can be bonded to the exterior of outer cover 26 to provide a finished hose.

Figure 8A:
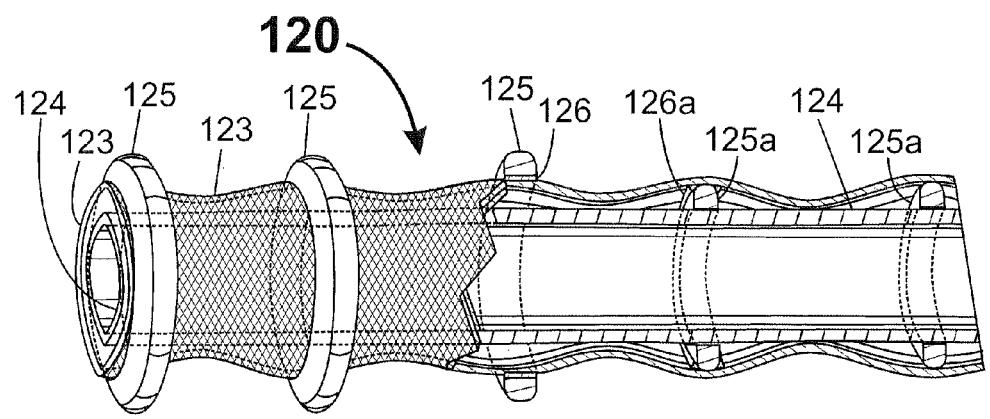
FIG. 8A-B Perspective section views of corrugated retractable hose 120 in extended and retracted states, respectively.
Figure 8B:
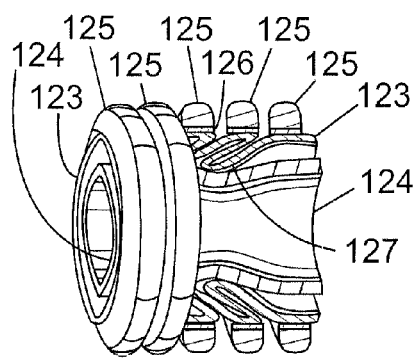

In FIGS. 8A and 8B we see elastically retractable hose 120 comprising a woven outer cover 123, an inner elastic hose 124, a plurality of exterior wear rings 125 bonded with adhesive layers 126, and optionally comprising interior support rings 125a bonded optionally with adhesive layers 126a. Outer cover 123 is woven with an alternating diameter that varies back and forth between a minimum diameter and a maximum diameter much like that seen in outer cover 26 in FIG. 2B where a reduced diameter portions 35a can be woven into the outer cover periodically. In this particular example in FIG. 8, the minimum and maximum diameters are repeated successively so that cover 123 forms a corrugated structure. Cover 123 can have a minimum diameter sections (valleys) with an interior diameter about the same as the exterior diameter of elastic hose 124, and can have a maximum diameter sections (ridges) with an interior diameter about the same as the outside diameter of support rings 125a. This variation in radius of outer cover 123 can be seen in the sectioned portions of FIG. 8A, as having an approximately sinusoidal shape. The reader should understand that many other variations in the radius can be used to produce different valley shapes. For example, the valley portion of cover 123 might be more v-shaped with sharper valley bottom and straighter side walls. Also, the valley portion of outer cover 123 might be asymmetric with one side of the valley wall having a steeper angle than the other side (valley not centered between adjacent ridges). Thus, shape of the valley portions can be tailored in a variety of ways for specific needs.

In FIG. 8B we see one advantage of having a corrugated outer cover 123 which is that it facilitates or assists in the controlled longitudinal collapse (folding) of the outer cover into pleated sections 127. Wear rings 125 are placed at the apex of the ridges to provide wear protection. With this design, the valley portions of cover 123 tend to fold under the ridge portions of the cover so that the outer cover folds smoothly and outer wear rings 125 can collapse adjacent each other. Inner hose 124 can compress radially as shown to allow room for cover 123 to fold inward and form pleats 127. This pleating action of outer cover 123 can be facilitated by various radial corrugated shapes of the cover (i.e. v-shaped, asymmetric valley, sinusoidal, etc.).

Besides exterior wear structures 125, alternative internal support rings 125a can be positioned between inner elastic hose 124 and outer cover 123. These support rings can be bonded using an adhesive ring 126a between cover 123 and support ring 125a. These support rings 125a can be used to guide the weaving of the ridge portions of outer cover 123 during manufacturing by inserting the support rings in the outer cover during the weaving process. Adhesives 126a can be used to secure support rings in place within cover 123. Alternative support rings 125a are not shown in FIG. 8B, but can be used together with wear rings 125 or by themselves with outer cover 123. Exterior wear rings 125 can be bonded onto outer cover 123 with adhesives 126 after the cover is woven. Many other alternatively wear structures besides wear rings 125 can have various shapes (for example see FIGS. 2C and 3A) and thicknesses as desired.

Adhesives

As the reader should understand from the previous discussions, the use of bonding agents and structures for bonding specific components of the disclosed retractable pressure hoses together can materially contribute to the hoses' operation and durability. However, the composition of these bonding materials, and the positioning, shaping and applying of the bonding structures can vary greatly. For example, the bonding structures used to bond the inner hose to the outer cover can take the form of bonding strips, bonding patches or pads that follow a spiral path, bonding patches or pads that are periodically positioned not along a spiral path, or even random patterns of bonding patches or pads (see bonding structures 31, 33, 33a, 35, 53, 61, 73, 81, 83, 93, 95, 95a, 101, and 103). The locations these bonding agents can be applied is also diverse, where they can be applied to the inner hose, outer cover, and/or wear strips, buttons, and dots. The bonding materials can also be applied before, during or after the construction of particular parts of the retractable hose. Further, the bonding materials can also be applied in a non-adhesive state to the inner hose, outer cover, and/or wear resistant components and then later activated to bond these components together to complete the retractable hose. The bonding agents themselves (material the bonding structures comprise) can be very diverse and can include, but are not limited to, adhesives, polymer adhesives, UV cured adhesives, thermally cured adhesives, chemically cured adhesives, flexible thermal polymers, soft elastomers, a foamed polymers and/or elastomers, etc. Also, weakly bonding adhesives can be used that hold the inner hose in place against inside of the outer cover. These weakly bonding adhesives can temporarily come apart if enough force is applied and can be designed to rebond multiple times to allow the elastic tube and outer cover to shift and rebond many times during the useful life of the hose. Finally, the bonding structures and bonding agents can comprise the actual hose structure itself, in which case, no additional bonding structures are needed (i.e. inner hose is thermally and/or mechanically bonded to the outer cover).

The adhesives used can also be activated by microwave radiation (MR) or infrared radiation (IR). For example, the bonding adhesives discussed in this disclosure can be activated by microwaves if the adhesive polymer is electrically conductive and/or strongly absorbs microwaves. Similarly, if the adhesive polymer strongly absorbs a particular infrared frequency that is not strongly absorbed by the rest of the hose, an IR activated adhesive can be used. Such radiation absorbing adhesives (i.e. microwave or infrared absorbing) can be applied to one or both surfaces that are to be bonded and can remain tack-free until positioned. Once in position the MR or IR absorbing adhesive can be activated by irradiating the entire structure (e.g. entire hose) with the proper radiation. The microwave radiation can pass through most plastics very easily and quickly heat the conductive adhesive (polymer blend mixed with microwave absorbing component or components) and melt the conductive adhesive and permanently bonding to both surfaces (e.g. the inner hose and the outer cover). After it has cooled, the conductive adhesive can return to a tack-free state. In alternative microwave bonding methods, a first adhesive 103a can be used to bond to the first surface (e.g. inner hose 104a) and a microwave absorbing second adhesive 103b that bonds strongly to the first adhesive (see FIG. 4D) and also bonds strongly to a second surface (e.g. outer cover 26) when heated. When irradiated with microwaves, the second adhesive 103b melts and completes the bonding process by bonding to both the second surface and to the first adhesive. For these microwave activation adhesives to work, the remainder of the retractable hoses 80 and 100 cannot absorb the microwaves so strongly that they also melt during the bonding process or interfere significantly with getting microwaves to the conductive adhesives. This use of conductive adhesives can be used to bond together products other than retractable hose structures disclosed in this disclosure.

Inner Hose Construction

In FIGS. 1A through 4B, elastic hoses 24, 44, 64, 74, 84, and 104 are shown comprising an elastic hose material that has significant elastic properties. However the single wall construction shown in these examples is not the only possible construction and many examples of elastic multilayer hose constructions are also possible. For example, elastic inner hoses 24, 44, 64, 74, 84, 104 and others can comprise multiple bonded layers to achieve specific properties for that inner hose. Different layer properties can be combined to provide the needed elasticity, durability, and wear ability.

In FIGS. 6C through 7D, we see six examples of possible alternative composite flexible inner hoses 92a-f, which can comprise the material layers seen in inner hoses 94a, 94b, and 94c discussed previously. In these examples, inner hoses 94a, 94b and 94c do not need significant elastic properties, but do need to be flexible, so they can be attached to reinforcement layers 91a-f and/or additional polymer layer 93 without significantly limiting their desired folding properties. Inner hose layers 94a, 94b and 94c can be reshaped to bonded fully, bonded partially, and/or completely encapsulate reinforcement layers 91a-f. The other elastic inner hoses disclosed in this disclosure can also further include these additional reinforcement layers to achieve the desired inner hose properties. In the examples seen in FIGS. 6C through 7D, any one of inner hose layers 94a, 94b or 94c (94a⇔c) can be used in composite inner hoses 92a-f. The use of the reference number term "94a⇔c" is used here to state that any one of the three inner hose layer materials comprising inner hoses 94a, 94b or 94c can be used. This is in contrast to the reference number term "94a-c" which is used when discussing the group of inner hoses 94a, 94b and 94c.

In FIGS. 6C through 7D we see six examples of composite flexible inner hoses 92a-f to provide a very thin water-proof and air-tight inner hose structure that is also very tough and durable. These flexible composite inner hoses 92a-f can be used to replace inner hoses 94a-c in hoses 90a-c seen in FIGS. 5A-C, respectively. Composite inner hoses 92a-c are still required to be flexible enough for operation of hoses 90a-c, which in most cases, will mean that composite inner hoses 92a-c will need to be very thin. This is at conflict with the need for durability for the inner hoses. To achieve these properties, inner hose materials seen in inner hoses 94a-c can be reinforced with a strong reinforcing layer (woven, braided, mesh, sheet, fibers, strain strengthened polymer layers, etc.) to provide a very thin water-proof and airtight inner hose structure that is also very strong, tough, and durable. A woven or knitted fabric, because of its intertwined fiber construction can be both very strong and very flexible at the same time. Because inner hoses 94a-c do not need to stretch significantly when used in hoses 90a-c, respectively, only flex, they can be fully bonded to these flexible reinforcing material(s) even though the reinforcement may not be able to stretch significantly under stress. Elastic polymers and flexible polymers that can be used for such inner hoses often have a maximum tensile strength of between about 1,000 and about 2,500 pounds per square inch (PSI). However, fibers made of nylon, polyester or polypropylene that are used for woven reinforcement can have maximum tensile strengths thirty to sixty times greater. For high strength and flexibility, these polymer fibers are usually made very thin and bundled in strands (yarns) that can have hundreds of separate fibers. Thus, the addition of a thin layer of woven fabric to inner hoses 94a-c can allow the use of a very thin inner hoses while still maintaining good tensile strength, flexibility, and durability. These types of fibrous materials can be used in reinforcement layers 91a-e. In FIGS. 6C through 7D, we will see several examples of this combining of a reinforcing layer with the sealing inner hose material 94a, 94b, or 94c (94a⇔c).

Figure 6C:
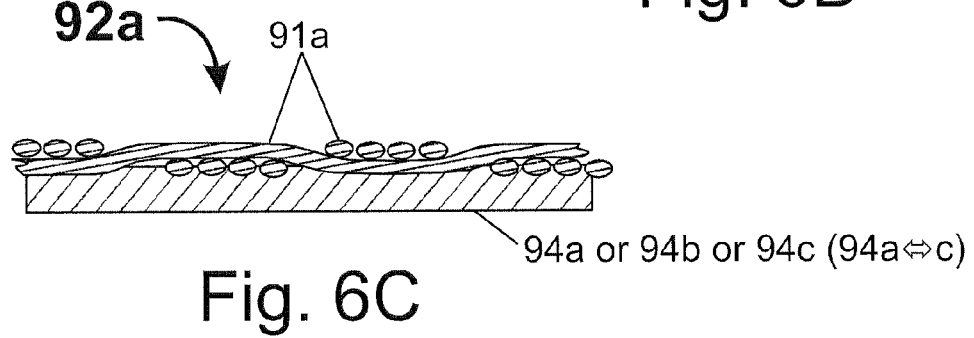
FIG. 6C Section side-view of fabric reinforced inner hose layer.

In FIG. 6C, we see a closeup section-view of composite inner hose 92a, comprising a flexible inner hose 94a, 94b, or 94c (94a⇔c) and a fabric tube reinforcement 91a. Fabric tube 91a can comprise woven, knitted, or braided fibers or yarns that provide very good tensile strength for inner hose layers 94a-c. Fabric tube 91a is shown near its actual design thickness, but can be made thicker or thinner depending on the particular hose design. In this particular example, fabric tube 91a is only weakly bonded to the outer surface of inner hose 94a⇔c. In alternate designs, fabric tube 91a can be deeply embedded in inner hose 94a⇔c for a strong bond. These designs places fabric tube 91a on the exterior of composite inner hose 92a so that it has good wear properties when pressed up against the interior surface of outer cover 26 (see FIGS. 5A-C).

Figure 6D:
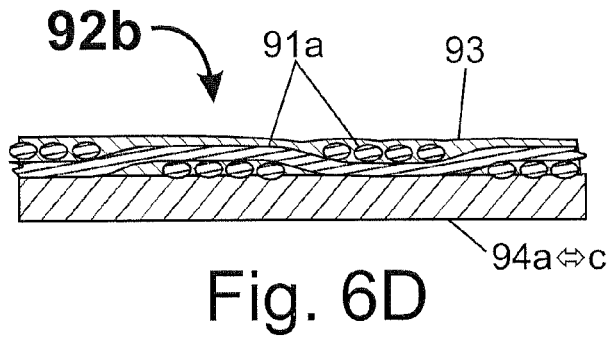
FIG. 6D Section side-view fabric and polymer reinforced inner hose layer.

In FIG. 6D, we see a closeup section-view of composite inner hose 92b, comprising a flexible inner hose 94a, 94b, or 94c (94a⇔c), a woven, knitted or braided fabric tube reinforcement 91a, and a bonded outer coating layer 93. This design is very similar to composite inner hose 92a with the addition of a exterior bonded layer 93 that bonds fabric tube 91a securely to the inner hose 94a⇔c. Bonded layer 93 can be a soft flexible elastomer or foamed polymer that allows fabric tube 91a to easily flex and fold as needed. Bonding layer 93 also can bond strongly to fabric 91a and/or inner hose 94a⇔c. Bonded layer 93 can also be designed to have a high friction coefficient with cover 26 so that additional bonding between inner hose 92b and cover 26 might not be needed. Alternatively, bonded layer 93 can have a low coefficient of friction with cover 26 so that it can easily adjust its position within cover 26. Also, bonding layer 93 can be designed to bond to outer cover 26 through thermal bonding or other methods.

Figure 7A:
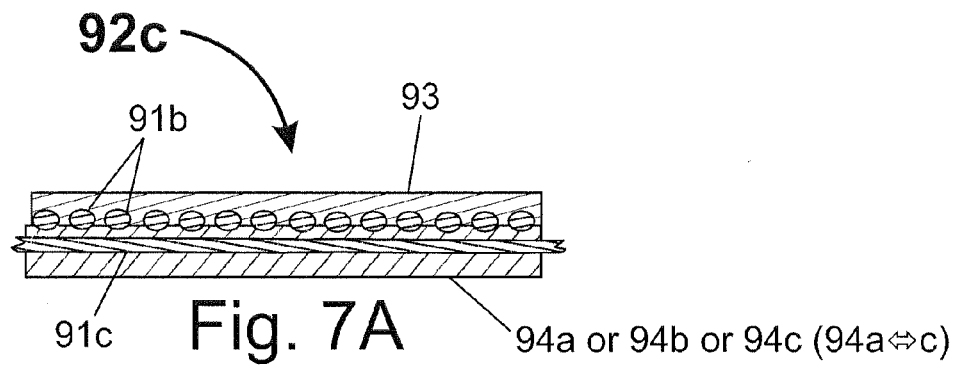
FIG. 7A-C Cross-section view of various fiber reinforced inner hose layers.

In FIG. 7A, we see a closeup section-view of composite inner hose 92c, comprising a flexible inner hose 94a, 94b, or 94c (94a⇔c), and a plurality of longitudinal fibers or yarns 91c cross-extruded with the inner hose 94a⇔c, and one or more radial fibers or yarns 91b. Radial yarns 91b are wrapped around the inner hose and longitudinal fibers 91c to provide radial strength to the hose. An outer coating of polymer material 93 can be bonded over radial yarns 91b, longitudinal yarns 91c, and inner hose 94a⇔c. This design is very similar to composite inner hose 92b, but fabric tube 91a is replaced with two layers of reinforcement yarns 91b-c bonded within layers 93 and 94a⇔c. These yarn layers 91b-c are securely bonded to composite inner hose 92c by the bond between layer 93 and inner hose 94a⇔c. Bonded layer 93 can provide the same benefits as it did for composite inner hose 92b. Bonding layer 93 can be designed to selectively bonded to outer cover 26 through a number of bonding methods.

Figure 7B:
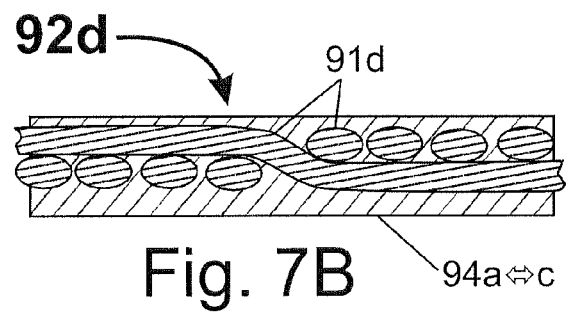

In FIG. 7B, we see a closeup section-view of composite inner hose 92d, comprising a flexible inner hose 94a, 94b, or 94c (94a⇔c), and an embedded woven or braided fabric tube 91d. In this example, fabric tube 91d, which can be similar to fabric tube 91a, can be encased in a flexible polymer used for inner hoses 94a, 94b, or 94c. Fabric tube 91d can be very porous so that inner hose materials 94a-c can bond mechanically through the fabric to hold everything together, and/or materials comprising hoses 94a-c can strongly bond to fabric tube 91d or a coating on fabric tube 91d. By placing fabric tube 91d near the middle of layer 94a⇔c it can easily flex with the flexible polymers that comprise hose layer 94a⇔c.

Figure 7C:
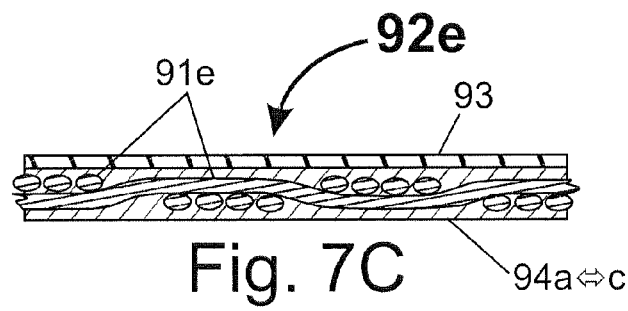

In FIG. 7C, we see a closeup section-view of composite inner hose 92e, comprising a flexible inner hose 94a, 94b, or 94c (94a⇔c), a woven reinforcement tube 91e, and an outer bonded layer 93. In this example, woven tube 91e can be cross-extruded with inner hose 94a⇔c so it is strongly bonded within the inner hose. Outer layer 93 is formed over inner hose 94a⇔c and bonded to the outer surface of inner hose 94a⇔c to provide specific properties for the external surface of the inner hose (e.g. low friction surface, high friction surface, thermal bonding surface for bonding to cover 26, adhesive layer for selective bonding, wear resistant surface, etc). Woven reinforcement 91e can comprise flexible multi-strand yarns that can be similar to woven reinforcement 91a.

Figure 7D:
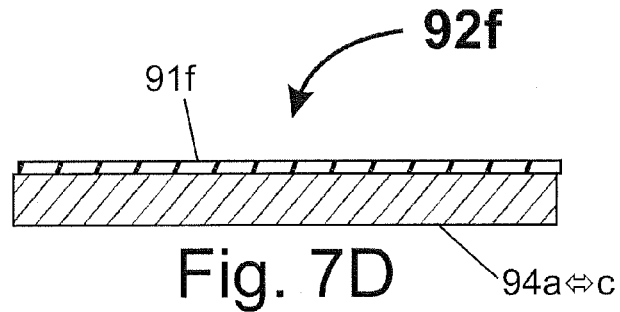
FIG. 7D Section side view of polymer sheet reinforced inner hose layer.

In FIG. 7D, we see a closeup section-view of composite inner hose 92f, comprising a flexible inner hose 94a, 94b, or 94c (94a⇔c) that is bonded to a strong and durable outer polymer tube layer 91f. Outer polymer layer 91f can be very thin but provide a high tensile strength to composite hose 92f. Bonding between layer 91f and inner hoses 94a-c can be very strong so that they do not delaminate during use. In alternative designs, layer 91f can be sandwiched between two layers of 94a, 94b and/or 94c. In other alternate designs layer 91f can be bonded to inner hose 94a⇔c only at specific locations to allow the system more flexibility when folding and crumpling during use. Layer 91f can be made very thin so a high strength polymer that is relatively stiff can be used to strengthen composite hose 92f. Layer 91f can comprise a multilayer polymer tube where the polymer layers are stretched in different directions to increase their tensile strength in those directions. Layer 91f can also comprise high-strength fibers to strengthen it.

In FIGS. 6C, 6D, 7A, 7B, 7C, and 7D, reinforcements 91a, 91a, 91b-c, 91d, 91e and 91f, respectively, are shown strengthening inner hoses 92a-f, respectively. If reinforcements 91a, 91a, 91b-c, 91d, 91e and 91f are made more robust (such as similar to outer cover 26), then inner hoses 92a-f can be used to replace the combination of outer cover 26 and inner hose 94a⇔c seen in the retractable hose design 90a and 90c, in FIGS. 5A & 5C, respectively. These composite hoses 92a-f would still be very thin and strong so they can allow retractable hoses 90a-c to retract under tension from coiled spring wire 97.

Manufacturing Methods—FIGS. 1A-B, 2A-C, 3A-C, 4A-B, 5A-C, 6A-D, 7A-D

In FIG. 1A-B we see prior art elastic-biased stretch hose 20, which can be manufactured in a number of ways. For example, inner hose 24 and outer cover 26 can be made separately and then inner hose 24 can be slid inside cover 26 and then connectors 22 and 28 bonded to each of their ends. Alternatively, inner hose 24 can be made separately and outer cover 26 woven around hose 24 to form the hose section. Since the natural length of outer cover 26 is considerably longer than the natural length of elastic inner hose 24, outer cover 26 might be longitudinally compressed over inner hose 24, or inner hose 24 stretched to the length of outer cover 26, or a combination of the two, when connecting the ends. A mandrel system can be used to facilitate these processes.

In FIGS. 2A through 2C, elastic inner hose 24 and woven outer cover 26 can be assembled similar to described above for stretch hose 20. The introduction of wear strip 32 and wear rings 34, 34a, and 36, means that an additional manufacturing step is needed to bond these wear resistant protectors onto the exterior of cover 26. This bonding step can occur nearly anytime during or after the manufacture and/or assembly of the retractable hose 30 or cover 26.

In FIG. 2A, wear strip 32 can be extruded inside outer cover 26 immediately after cover 26 has been woven. The spiral shape of wear strip 32 can be achieved by a two molds on each side of cover 26 forming its portion of the spiral shaped wear strip 32. Alternatively, an extrusion nozzle could extrude strip 32 onto cover 26 in a secondary process or during the weaving or knitting manufacturing process. Materials can be chosen for wear strip 32 so that it can thermally bond to outer cover 26 during the extrusion process that forms wear strip 32. Cover 26 can also comprise fibers or yarns that are coated with a material that will thermally bond to extruded strip 32 when hot. Alternatively, strip 32 can be pre-made and bonded to cover 26 with adhesive layer 31. Alternatively, strip 32 with adhesive layer 31 can be pre-made and later wrapped onto hose 30. If adhesive layer 31 is heat sensitive (melts at a lower temperature than hose 24 and cover 26), then the hose can be heated from inside or from outside until adhesive layer 31 bonds to cover 26. After wear strip 32 is bonded to outer cover 26 and inner hose 24 inserted, end connectors such as input connector 22 and output connectors 28 (see FIGS. 1A-B) can be bonded to the ends to complete the hose. Of course many other manufacturing procedures can be done to assembly this type of elastic stretch hose.

In FIGS. 2B-C and 3C, the construction of the retractable hoses 40, 40a, and 70 can comprise manufacturing the outer cover 26 and then inserting inner hoses 44, 24, and 74, respectfully. Wear rings 34, 34a, 36 and 72 can be bonded to outer cover 26 before or after this assembly process of inserting inner hoses 44, 24, and 74. A variety of methods can be used to form and bond wear rings 34, 34a, 36 and 72 to outer cover 26. First, the wear rings can be extruded onto outer cover 26 immediately before insertion of the inner hose. This can comprise bonding the wear rings to cover 26 just after it is woven onto a mandrel. The extruder could move with outer cover 26 as it is being made to provide time to inject the wear rings on that section of outer cover 26 and allow them to cool. After sufficient cooling the extruder would then return to its starting position and injection mold another set of wear rings onto cover 26 after it is woven. The shape of the wear rings would be determined by the shape of the injection molds. Many wear rings can be injection molded at one time. Second, wear rings 34, 34a, 36 and 72 can comprise two or more sections that can be snap, and/or bonded together around outer cover 26 and/or bonded to cover 26 with adhesives 33, 35 or 73, thermal bonding, and/or other bonding methods. Such snap together wear rings (34, 34a, 36 and 72) can be injection molded in separate process and later snapped together and bonded to each other and outer cover 26. Adhesives or ultrasonic welding can be used to bond the wear ring sections together. The rest of the assembly of hoses 40, 40a and 70 can be similar to the process discussed previously for retractable hose 30.

In FIG. 2B, when manufacturing outer cover 26, the constriction seen at contact surface 35a (reduced diameter section), can be easily woven directly into the shape of cover 26 by changing the length of fibers or yarns reeled out in the radial direction during the weaving, braiding, or knitting process. For example, when weaving a cylindrical tube, the weaving machine can use both radial and longitudinal yarns to form cover 26. In a simple hose weaving operation one or more radial yarn(s) can rotate around cover 26 while weaving in and out of a plurality of longitudinal yarns, and thus forming the woven tube shape. (This is close to the process for a braiding machine, where two sets of yarns rotate in opposite directions as they weave in and out of each other, and can also be used). To weave the constricted section 35a (reduced diameter) of cover 26, the length of the radial yarn(s) can be shorten in that area by any of a number of control means (i.e. reducing the rate at which the radial yarns are fed into the weaving machine, reducing the mandrel size that the outer cover is being woven on, and/or other control method). This shortening of the radial yarn(s) forces the woven cover 26 to a smaller diameter. In other manufacturing systems, the radial yarns can comprise a one or more yarns that oscillates back and forth around the outer cover while weaving (alternating) in and out of the longitudinal yarns as it goes. This method can also produce the constricted section by shortening the length of the radial yarns in those sections of cover 26 by many different control means (i.e. reducing the rate at which the radial yarn are fed into the weaving machine, reducing the mandrel size that the outer cover is being woven on, increasing tension on the radial yarn, and/or other control method).

In some embodiments, a hose cover having different diameters across its length (i.e., a corrugated structure, see FIGS. 8A-B) may be manufactured using a weaving machine. The method may comprise the following steps in any suitable order. As used herein the terms "yarns" and "fibers" are used interchangeably. Yarns are fed into the weaving machine in a direction radial to the tubular hose covered to be manufactured. These "radial" yarns are woven in and out of the yarns fed longitudinally, i.e., the "longitudinal yarns," at a feed rate In this way, a portion of the hose cover having a first cross-sectional diameter is made. The radial yarns are then shortened and woven in and out of the longitudinal yarns. In this way, a second portion of the hose cover having a second cross-sectional diameter smaller than the first cross-sectional diameter is made. The radial yarns may then be lengthened and woven in and out of the longitudinal yarns to make a third portion of the hose cover having a third cross-sectional diameter that is the same as the first. This process may be repeated as desired to form a hose cover that has constricted portions (i.e., a hose cover with a corrugated structure.) In these embodiments, the radial yarns may be shortened using any suitable method. Non-limiting examples of suitable methods include: reducing the first feeding rate of the radial yarns into the weaving machine; reducing the mandrel size of the weaving machine; increasing tension on the radial yarns; oscillating the radial yarns back and forth; and combinations thereof.

In some embodiments, a wear ring may be placed at the portions of the hose cover having the smaller cross-sectional diameters, the larger cross-sectional diameters and/or at both the smaller and the larger cross-sectional diameters. Optionally, the wear rings may be bonded to the hose at these portions using any suitable means including, but not limited to, being bonded to the hose via an activated adhesive composition comprising a bonding component responsive to heat and a microwave radiation absorbing compound intermixed with the bonding component.

In some embodiments, the method may comprise in any suitable order, the steps of: feeding radial yarn(s) into the weaving machine in a direction radial to the tubular hose cover to be manufactured; weaving the radial yarns in and out of the longitudinal yarns at a feed rate; varying the feed rate between a maximum feed rate and a minimum feed rate, such that the maximum feed rate produces the second cross-sectional diameter portions of the tubular woven hose cover and the minimum feed rate produces the first cross-sectional diameter of the tubular woven hose cover. In these embodiments, the circumference of the radial yarns are shortened by: reducing the feed rate to the minimum feed rate of the radial yarns into the weaving machine; reducing the mandrel size of the weaving machine; increasing tension on the radial yarns; oscillating the radial yarns back and forth; and combinations thereof. These embodiments may comprise further step(s) selected from the group of: bonding wear rings on the outer surface of the tubular hose cover at the first portion having the first cross-sectional diameter, and/or bonding the wear ring to the outer surface of the tubular hose cover at the second portion having the second cross-sectional diameter.

In FIG. 3A, when manufacturing retractable hose 50, the variety of wear structures 52, and 52a-e can be bonded to outer cover 26 in a number of methods. Similar bonding methods as described previously can also be used here, comprising, injection molding, extrusion bonding (thermal bonding), adhesive 53, etc. For the smaller wear dots 52d and 52e, a plurality of extrusion nozzles can extrude the dots onto cover 26 as the nozzles intermittently move with the cover. This process could be similar to a multi-nozzle hot glue gun that dabs hot glue onto cover 26 at specific points. Because of the small size of the dots, they would cool very quickly.

In FIGS. 3B and 3C, corrugated inner hoses 64 and 74 are seen inserted inside outer cover 26. The Inner hoses 64 and 74 can easily be pulled inside cover 26 and connector ends 22 and 28 bonded to each end of cover 26 and inner hose 64 or 74. However, the tight fit of inner hoses 64 and 74 might place portions of these inner hoses in a potentially damaging misplacement. Note: In FIGS. 3B and 3C, inner hoses 64 and 74 are shown in their substantially relaxed and retracted state, while outer cover 26 in FIGS. 3B-C are shown in their extended state (except for section 78, where cover 26 is shown in its collapsed state). To relieve any misalignment between cover 26 and inner hoses 64 and 74, the entire hose (both cover 26 and inner hose 64 or 74) can be stretched to their full extended length unpressurized, and then pressurized, and then released to retract slowly. The stretching without pressure would narrow inner hoses 64 and 74 so they do not bind against the inside walls of outer cover 26 and thus are evenly stretched. Some vibration of the hose can be used to insure an even stretch of the inner hose. Then when pressure is applied the inner hose seats against cover 26, so that as pressure is released, both outer cover 26 and inner hoses 64 and 74 can retract together in a controlled manner, and eliminating dangerous misalignments. Friction of inner hoses 64 and 74 against outer cover 26 can then hold them in place during future use. Alternatively, inner hoses 64 and 74 can be bonded to outer cover 26 at their ridges 66 and 76, respectively.

In FIGS. 3B, 4A, 4B, 4C-D, and 5B & 6B, inner hoses 64, 84, 104, 104a, and 94b, respectively, are shown bonded to outer cover 26. Inner hoses 64, 84, 104, 104a, and 94b are shown periodically bonded to outer cover 26 with adhesives structures 61, 81& 83, 101 & 103, 103a-b, and 99 & 99a, respectively. For corrugated hoses like inner hose 64 and convoluted hoses like inner hose 84, an adhesive can be coated on the ridges of these hoses and bonded to the interior surface of outer cover 26. The adhesive should be very flexible so that it can stretch and move with the inner hoses. Alternatively, bonding adhesives for structures 61, 81& 83, 101 & 103, 103a-b, and 99 & 99a can be applied to the interior surface of outer cover 26 while it is being manufactured and then activated to bond covers 26 to their respective inner hose. This provides less control as to where cover 26 is bonded on a corrugated inner hose like hoses 64 and 84, but can still allow the finished hose to function properly. A more controlled method of bonding only the ridges of inner hoses 64 and 84 can comprise inserting the inner hose into cover 26 and properly positioning the hose and cover. Then after collapsed, it will be obvious by the folds in outer cover 26 where the ridges of the inner hoses 64 and 84 are located. Because outer cover 26 can be porous, adhesives can be injected through outer cover 26 to bond the ridges of inner hoses 64 and 84 to outer cover 26. By this method, inner hoses 64 and 84 can be periodically bonded to their respective outer cover 26. The adhesive used can comprise nearly any polymer that will bond to both outer cover 26 and inner hoses 64 or 84. This last method is more labor intensive if not automated.

In FIGS. 4A, 4B and 4C, elastic inner hoses 84, 104 and 104a, respectively, are seen positioned inside outer cover 26. To manufacture these retractable hoses, the inner hoses and outer covers can be manufactured separately and then each inner hose 84, 104 and 104a inserted inside its outer cover 26. Bonding patches 81 and 101, bonding strip 83, or bonding rings 103, 103a and 103b can be applied to their respective inner hose prior to insertion inside cover 26. The outer cover and inner hose would be assembled and stretched to properly position the inner hose. Then the adhesive is activated permanently bonding the inner hose to the outer cover at patches 81 and 101, bonding strip 83, or bonding rings 103 and 103a. The bonding process can be activated by heat or chemicals or other methods. Bonding patches 81 and 101, bonding strip 83, or bonding rings 103 and 103a can comprise a microwave absorbing adhesive (e.g. conductive adhesive 103b) that can be applied to specific portions of the inner hoses or other desired locations. The microwave absorbing adhesive can remain tack-free while the inner hoses are properly position within their outer cover. Then the microwave absorbing adhesive can be activated by heating it with microwave radiation. During this process, the entire hose can be irradiated with high power microwave radiation to quickly heat the microwave absorbing adhesive (polymer blend mixed with conductive components and/or microwave absorbing components) and melt the microwave absorbing adhesive onto both the inner hose and the outer cover.

In FIG. 4D, we see an alternative bonding methods, where bonding adhesive ring 103a can comprise a first adhesive that bonds strongly to inner hose 104a at ridge ring 102a, and a second microwave absorbing adhesive 103b that bonds strongly to first adhesive 103a and also to outer cover 26 when heated. Examples of possible microwave absorbing adhesives can comprise nearly any polymer that can be combined with a microwave absorbing material. For example, conductive fibers might be added to the adhesive or polymer so that when bombarded by microwaves it heats up faster than outer cover 26, elastic tube 104a or adhesive 103a. When irradiated with microwaves, second adhesive 103b melts and completes the bonding process by bonding to outer cover 26 and first adhesive 103a. For microwave activated adhesive 103b to work properly with retractable hoses 80, 100 and 100a, the structure of these retractable hoses should not strongly absorb microwaves so they are not melted or damage during the bonding process nor interfere significantly with getting microwaves to microwave absorbing adhesive 103b (conductive adhesives). This use of microwave absorbing adhesives can be used to bond together the other example retractable hoses and wear structures disclosed in this disclosure.

In FIG. 5A, the construction of retractable hose 90a can be manufactured in a number of ways. First, cover 26 and inner hose 94a can be manufactured separately and then assembled and bonded together by any number of available bonding methods. In a second process, wire 97a (with wear cover 96) can be bonded to the exterior of outer cover 26. Second, inner hose 94a can be extruded and expanded with air pressure against outer cover 26 as it is being woven. Combining the weaving of cover 26 with the extrusion of inner hose 94a allows the extruder to be positioned where it can extrude into the interior of outer cover 26. Air pressure can then be used to expand the hot extruded inner hose 94a against the interior surface of outer cover 26 and thermally bond it to cover 26. The strength of this bond can be controlled by the extrusion material selected, the temperature of the extruded inner hose, the material outer cover 26 is made of or coated with, etc. After this bonding is completed, biasing coil spring 97a can be wrapped around the extended hose and bonded to outer cover 26 through adhesives or thermal bonding. Alternative methods of bonding wire coil 97a to cover 26 can comprise heating wire 97 electrically or inductively so that portions of wear cover 96 touching outer cover 26 melt and bond to cover 26.

In FIG. 5B, the construction of retractable hose 90b can be manufactured in a number of ways. First, cover 26 and inner hose 94b can be manufactured separately and then assembled and bonded together by any number of available bonding methods. Adhesive and/or thermal bonding can then be used to bond wire coil 97a to outer cover 26 while at the same time bonding inner hose 94b to outer cover 26. A second manufacturing method can also use pre-manufactured outer cover 26 and inner hose 94b, but wire coil 97a is first bonded to outer cover 26. Then inner hose 94b is inserted into outer cover 26 and shaped to the hose's interior surface. Optional bonding strip and pads 99 and 99a, respectively, can be used to hold inner hose 94b in place against outer cover 26. Third, inner hose 94b and/or outer cover 26 can be selectively coated with an adhesive (i.e. 99 or 99a) that is activated to bond the two components together at a later time. Wire 97a can then be bonded to the exterior of cover 26 in later process. Forth, inner hose 94b and/or outer cover 26 can be selectively coated with an adhesive 99 or 99a that is activated to bond the two components together when wire coil 97a is bonded to outer cover 26 and adhesives structures 99 or 99a can be activated thermally or by other activation means (e.g. chemical, radiation, microwaves, etc.).

In FIG. 5C, retractable hose 90c can be manufactured in a number of ways. A first method for manufacturing retractable hose 90c can begin with outer cover 26 and inner hose 94c being manufactured separately and then assembled and/or bonded together by a number of bonding methods. Alternatively, inner hose 94c can be extruded at the same time outer cover 26 is woven so that inner hose 94c expands inside cover 26. Because inner hose 94c is still hot when extruded it can bond to inner hose 94c if outer cover 26 comprises a bondable material. Additional heat or adhesives can be used to strongly bond inner hose 94c to outer cover 26. Coiled wire 97c (with or without optional protective cover 96c) can be made separately with a coiled diameter slightly larger than the diameter of inner hose 94c. To insert coiled wire 97c into inner hose 94c, the coiled wire 97c can be twisted to temporarily shrink its diameter so that it can be inserted inside the inner hose 94c and/or outer cover 26. After wire coil 97c is inserted, it is allowed to untwist which causes its to return partially to its original diameter. The untwisting of wire coil 97c is stopped by cover 26 which resists further expansion of the wire coil's diameter. The resulting forces can give retractable hose 90c a slightly convoluted shape.

A second method for manufacturing retractable hose 90c seen in FIG. 5C, comprises extruding inner hose 94c around wire coil 97c. This can be done by extruding a polymer strip onto rotating wire coil 97c as it is being coiled, and bonding the edges of the extruded polymer strip together to form sealed inner hose 94c. This combined extruded polymer strip and wire coiling process, is commonly used today to make air-tight vacuum cleaner stretch hoses. After inner hose 94c is formed over coiled wire 97c, outer cover 26 can be woven over inner hose 94c and coiled wire 97c in a separate process and form the completed retractable hose 90c. By weaving outer cover 26 last, the shape of outer cover 26 can be made more strongly convoluted (dips more into the valley between coils of wire 97c). That is, outer cover 26 can have much deeper valleys between adjacent wire coils than shown in FIG. 5C. This is possible because a convoluted hose can have a transverse cross-section that is relatively constant in diameter. This cross-sectional diameter of a convoluted hose is smaller than the diameter of wire coil 97c, so that the smaller cross-sectional diameter of cover 26 must follow and stay attached to wire coil 97c in cross-section. Standard hose weaving equipment can be used because of the relatively constant diameter of the outer cover even when convoluted. Additional forming equipment might be needed besides coiled wire 97c to shape hose 90c into the desired convoluted shape as cover 26 is woven onto helical wire coil 97c. Wire coil 97c can also help outer cover 26 hold this convoluted shape. Inner hose 94c can also be formed on wire coil 97c with a similar convoluted shape so that outer cover 26 can approximately match the shape of inner hose 94c when in their natural extended shape. This shape can be similar to present day vacuum cleaner stretch hoses.

A third method for manufacturing retractable hose 90c seen in FIG. 5C, comprises weaving outer cover 26 over wire coil 97c (wire 97 and cover 96c). Outer cover 26 can be woven with a number of shapes, including, but not limited to, cylindrical and convoluted. Inner hose 94c can be manufactured separately and then inserted into the combined wire coil 97c and woven cover 26. The shape of woven cover 26 substantially determines the final shape of retractable hose 90c and inner hose 94c. Inner hose 94c can be heated and pressurized to either bond inner hose 94c to wire coil 97c and/or cover 26, or to simply shape inner hose 94c to the interior surface of cover 26 and coil 97c. If woven cover 26 is made strongly convoluted (strong ridge and valley structure) then inner hose 94c will take on that shape when pressurized with liquids or gases flow through it. Notice that this design places inner hose 94c on the inside of coiled wire 97c. Alternatively, the shaping of inner hose 94c can occur after retractable hose 90c has been fitted with connector ends (e.g. connectors 22 and 28), then the complete retractable hose can be pressurize and heated to force inner hose 94c to permanently take on the shape of the interior surface of wire coil 97c and woven cover 26. This heating and shaping process can also be used to bond inner hose 94c to wire coil 97c and/or woven cover 26.

In FIG. 6A, hose 90a can be manufactured with bonding layer 99b by simply coating the interior of outer cover 26 with layer 99b prior to inserting inner hose 94a, or by extruding both tubes 99b and 94a, and expanding them together against outer cover 26. Also, equipment exists that can extrude both tube layers 99b and 94a together and expanded them together against cover 26 so that the adhesive tube layer 99b can bond to cover 26.

In FIGS. 6C and 6D, we see composite inner hoses 92a and 92b, respectively. Both of these types of laminated hose structures can be manufactured using present day hose laminating machines. However, as a result of the very thin nature required for composite inner hoses 92a and 92b, preferably less than forty thousandths of an inch, other manufacturing techniques will be used to improve manufacturing speed and quality. For example, composite inner hose 92a can be made by weaving an outer support cover 91a, and then extruding and expanding one of the inner hoses 94a$\Leftrightarrow$c against the interior surface of cover 91a. Heat alone can cause inner hoses 94a$\Leftrightarrow$c to bond to cover 91a if the proper materials are selected. Support cover 91a can also be coated with a polymer that assists in this bonding between support cover and inner hose. The fibers or yarns comprising support cover 91a can be coated prior to weaving to provide bonding. For composite inner hose 92b, layers 91a and 94a$\Leftrightarrow$c can be made similar to composite inner hose 92a outlined above, and then simply laminate another layer of material 93 over its exterior. Other methods, of course, can be used to manufacture these thin laminated inner hoses 92a-b.

In FIG. 7A, composite inner hose 92c can be manufactured in a three step process. First, inner hose layer 94a$\Leftrightarrow$c is cross-extruded with longitudinal yarns 91c embedded in this inner hose layer. This gives the composite inner hose 92c longitudinal strength. Second, radial yarns 91b are wrapped around inner hose layer 94a$\Leftrightarrow$c to give hose 92c radial strength. Third, outer coating 93 is extruded over radial yarns 91b and inner hose layer 94a$\Leftrightarrow$c to bond everything together. Radial yarns 91b can be wrapped around extruded inner layer 94a$\Leftrightarrow$c while it is still hot from the extrusion process.

In FIG. 7B, composite inner hose 92d can be manufactured in a two step process. First, tube 91d is woven prior to entering a cross-extruder. Then, woven tube 91d is cross-extruded with polymer inner hose layer 94a$\Leftrightarrow$c. With this process, woven tube 91d can be strongly bonded to inner hose material 94a$\Leftrightarrow$c because it has passed through the extrusion nozzle under both high-pressure and high-temperature. Woven tube 92d can be woven just prior to entering the cross-extruder to be extruded within inner hose layer 94a$\Leftrightarrow$c or be previously manufactured in a separate process. High temperature fibers like nylon and polyester can safely be cross-extruded with most elastomers that layer 94a$\Leftrightarrow$c might be made from. These high temperature fibers and/or woven tube 91d can be coated with additional polymers to further enhance bonding between polymer inner hose 94a$\Leftrightarrow$c and woven tube 91d.

In FIG. 7C, composite inner hose 92e can be manufactured by first cross-extruding woven tube 91e within inner hose layer 94a$\Leftrightarrow$c similar to the process seen for composite inner hose 92d in FIG. 7B. Next, outer layer material 93 can be extruded and pressed onto the outside surface of inner hose material 94a$\Leftrightarrow$c and woven tube 91e.

In FIG. 7D, composite inner hose 92e can be manufactured in a single step process. Where both exterior layer 91f and inner hose layer 94a$\Leftrightarrow$c are extruded together to form the final composite inner hose.

In FIGS. 8A-B outer cover 123 can be manufactured similar to they way minimum diameter section 35a was manufactured (see FIG. 2B). The minimum and maximum diameters can be woven into cover 123 by controlling the circumferential lengths of the radial yarns in each of those section. Thus, because the radial yarns are formed at different diameters, the outer cover can support internal pressure within hose 120 and still maintain the shown corrugated shape of outer cover 123 seen in FIG. 8A. By maintaining this corrugated structure, cover 123 can fold more smoothly into a retracted position than a constant diameter outer cover (see outer cover 26), which tends to fold haphazardly. Outer cover 123 tends to form pleated shape when compressed longitudinally.

Operational Description—FIGS. 1A through 7D

In FIGS. 1A-B, prior art retractable hose 20 is seen with elastic inner hose 24, which has a relatively thick wall to provide strength to resist water pressure and resist friction against outer cover 26. The diameter of inner hose 24 is approximately half the diameter of outer cover 26 so that inner hose 24 does not begin to press against the interior surface of outer cover 26 until considerable internal pressure is already applied, and retractable hose 20 has started to extended. This prevents significant friction from forming between inner hose 24 and outer cover 26 until after retractable hose 20 is partially extended. As pressure increases, inner hose 24 presses up against outer cover 26 and the hose continues to expand longitudinally. As pressure further increases, inner hose 24 slides within outer cover 26 until outer cover 26 reaches its full length and hose 20 is at its full length. When water pressure is removed, the elastic biasing tension in inner hose 24 causes retractable hose 20 to retract and even force out the water that is within it.

In FIGS. 2A-C, retractable hose 30 is seen with wear resistant protective strip 32, and retractable hoses 40 and 40a are seen with wear resistant protection rings 34, 34a, and 36. In operation, when outer cover 26 is extended as shown in FIGS. 2A-C, wear strip 32, and wear rings 34, 34a, and 36 contact the ground or other flat surface before outer cover 26. Thus, during use, cover 26 is protected from damage by wear structures 32, 34, 34a, and 36 which take the majority of contact with abrasive and wearing surfaces. When not in use, hoses 30, 40, and 40a are retracted, and wear strip 32, and wear rings 34, 34a, and 36, are collapsed next to each other to protect outer cover 26 from damage during storage. The wear strip and wear rings also help protect outer cover 26 from UV radiation when retracted. Wear structures 52, and 52a-e, seen in FIG. 3A, provide similar wear protection and somewhat similar UV protection.

In FIGS. 3B-C and 4A, retractable hoses 60, 70 and 80 are shown with corrugated and convoluted elastic inner hoses. In each example, inner hoses 64, 74, and 84 are shown in their retracted state. Collapsed section 78 of outer cover 26 seen in FIG. 3C and outer cover 26 seen in FIG. 4A show the folded, retracted, or collapsed state of outer cover 26. During operation, when pressure is introduced into retractable hoses 60, 70, and 80 (inner hoses 64, 74, and 84, respectively,) only a small amount of pressure is needed to begin extending the ridged nature of these hoses. Ridges 66, 76, and 86 quickly begin pressing against the inner surface of cover 26. Inner hoses 64, 74 and 84 can then stretch to about twice their relaxed state with relatively small amount of pressure (small amount of longitudinal strain in the inner hoses). As greater pressure is applied the inner hoses will substantially straighten out against outer cover 26. Because of the corrugated and convoluted structure of these inner hoses 64, 74 and 84 strain in the hose material can be reduced to about half what it is in prior art cylindrical inner hoses. This means that the elastic material comprising inner hoses 64, 74, and 84 can encounter significant less internal strain than cylindrical inner hoses 24, 44, 104 and 104a for the same amount of longitudinal extension of their respective hoses. That is, at first, hoses 64, 74 and 84 simply straighten out their corrigations when extended lengthwise. Once the corrugations are straightened out then the hose begin to stretch like a cylindrical hose. This means retractable hoses 60, 70, and 80 can have an extended-to-retracted length ratio of seven-to-one or more. Prior art retractable hoses are presently limited to about three-to-one extended-to-retracted length ratios because of the limits of known elastic materials and their construction. When retracting hoses 60, 70 and 80, the ridges 66, 76, and 86 respectively, tend to grip the inner wall of cover 26 (even without bonding) and prevent slippage, while valleys 67, 77, and 87 contract radially to make room for cover 26 as it folds and crumples longitudinally.

In FIGS. 3B and 4A-B, retractable hoses 60, 80 and 100 are shown with periodic bonding structures 61, 81 & 83, and 101 & 103, which bond inner hoses 64, 84, and 104, respectively, to their outer cover 26. This periodic bonding of inner hose to outer cover forces outer cover to fold evenly between each bonding section. When extending and retracting, outer cover 26 can only make small shifts away from its extended position on inner hoses 64, 84, and 104. Because of this only small friction forces are generated between inner hoses 64, 84, and 104 and outer cover 26. And with small friction forces the wall thickness of inner hoses 64, 84, and 104 can be made thinner than prior art retractable hoses. Because the wall thickness of the inner hoses can be reduced, retractable hoses 60, 80 and 100 can have a significantly reduced retracting force on the hose when fully extended. Retractable hoses 60 and 80 can further reduce the retracting force because of their corrugated and convoluted shapes, respectively.

In FIGS. 4C-D, inner hose 104a solves one potential problem with retractable hoses 60, 80 and 100, where highly elastic inner hoses 64, 84, and 104 are bonded to substantially non-elastic outer cover 26 with bonding structures 61, 81 & 83, and 101 & 103, respectively. This bonding of an elastic inner hose to a non-elastic outer cover can benefit from an interface that can distribute strain created during stretching. There are many ways of distributing strain. In the example seen in FIGS. 4C-D, longitudinal strain in inner hose 104a is distributed by using an elastic bonding ridges 102a which can stretch at its inner diameter with inner hose portion 104a and remain substantially fixed in shape at its outer diameter bonded to outer cover 26. Thus, during operation, when hose 100a is extended, the inner and outer diameter portions of ridges 102a can be stretched by different amounts. At the inner diameter of ridges 102a, the ridges are longitudinally highly strained, while at the outer diameter of ridges 102a the ridges are substantially longitudinally unstrained. The result is the bonding adhesives 103a-b do not have to sustain high stresses or strains during operation of hose 100a.

In FIGS. 5A-C, hoses 90a-c are shown in their extended position (extended state). Internal pressure provides the extending force needed to overcome the retracting bias force of coiled spring wire 97 and provide these extended positions. Inner hoses 94a-c and outer covers 26 are thus substantially extended during normal operation, even though coiled wire 97 is trying to longitudinally retract these hoses. When internal pressure is reduced or removed, coiled spring wire 97 can pull inner hoses 94a-c and outer covers 26 in the longitudinal direction to collapse and fold retractable hoses 90a-c to their fully retracted position. These retracted positions would fold inner hoses 94a-c and cover 26 in a manner similar to the way outer cover 26 is seen folded in FIGS. 4A-D. In retractable hose designs 90b-c, where inner hoses 94b-c, respectively, are only bonded periodically to outer cover 26, the inner hoses 94b-c can crumple and fold between bonds differently than outer cover 26. This allows inner hoses 94b-c to more easily get out of the way of outer cover 26 as it collapses and folds into a particular retracted state (retracted position).

In FIGS. 6C through 7D, six examples of composite inner hoses 92a-f are shown. These composite inner hoses 92a-f would operate substantially the same way as inner hoses 94a-c, but would provide a reinforcement layer (see layers 91a-0 to substantially increase the tearing strength of these composite inner hoses. Composite inner hoses 92a-c, when combined with outer covers 26, can fold and crumple in a way similar to the folding and crumpling of inner hoses 94a-c and outer covers 26 of retractable hoses 90a-c, respectively. An exterior layer 93 can be used to assist in bonding the inner hose to cover 26, or to reduce friction of the inner hose against outer cover 26. Woven fiber layer 91a can also assist in bonding composite inner hose 92a with the interior surface of an outer cover 26 by providing a textured surface for adhesives or thermal bonding to adhere.

In FIGS. 8A-B we see retractable hose 120 in its extended and retracted positions, respectively. In FIG. 8A, outer cover 123 is shown extended as if fully pressurized, but elastic inner hose 124 is shown substantially unpressurized to show the relative sizes of these two components in their natural state. When fully pressurized elastic inner hose 124 would press up against the inside surface of outer cover 123 and outer cover 123 would substantially maintain its shape shown in FIG. 8A. In this extended state the user can use the hose to conduct a liquid or gas. When internal pressure is removed from inner hose 124, the elastic biasing in inner hose 124 tends to retract hose 120 and cause outer cover 123 to fold into a pleated pattern 127 as seen in FIG. 8B. This pleating of outer cover 123 allows wear rings 125 to collapse next to each other to protect the collapsed hose, and also give the hose an esthetically pleasing and organized outer surface for stowage.

Several advances are presented here and many alternate designs are possible for each specific improvement. Accordingly, although the above description of the invention contains many specifications, these should not be viewed as limiting the scope of the invention. Instead, the above description should be considered illustrations of some of the presently preferred embodiments of this invention. For example, many alternate wear structures are possible not just those shown. Outer cover 26, can be replaced by other reinforced covers that can handle the forces caused by internal pressure and use of the retractable hoses. Also, many additional combinations of outer cover, inner hose, and bonding methods are possible. Further, the relative sizes of inner hose and outer cover can be adjusted as needed for specific hoses. Also, the corrugated and convoluted inner hoses can comprise other cross-sectional shapes beside the sinusoidal shaped cross-sections shown. Finally, many alternative bonding methods exist and many different adhesives can be used depending on the materials types being bonded.

Thus, the scope of protection accorded by this document or any document related to this document should or any related document, should be understood as being defined by the claims in such document, when the terms in those claims which are listed under an "Explicit Definitions" heading are given the explicit definitions provided, and the remaining terms are given their broadest reasonable interpretation as shown by a general purpose dictionary. To the extent that the interpretation which would be given to the claims based on this document is in any way narrower than the interpretation which would be given based on the "Explicit Definitions" and the broadest reasonable interpretation as provided by a general purpose dictionary, the "Explicit Definitions" and broadest reasonable interpretation as provided by a general purpose dictionary shall control, and the inconsistent usage of terms in the specification or priority documents shall have no effect.

Explicit Definitions

When used in the claims, entities are "engaged" when their movement relative to each other is impeded. Non-limiting examples of the means by which entities may be "engaged" include: physical bonding of the entities together (e.g. via adhesive); chemical bonding of the entities together (e.g., bonding at a molecular level); frictional forces between the entities; and combinations thereof.

When used in the claims, entities are "freely movable" when they are not "engaged." i.e., their movement relative to each other is not impeded, such as for example, by frictional forces between the entities.

When used in the claims, "wear resistant button" should be understood to mean one of a plurality of wear resistant structures on the exterior surface of a retractable hose cover that are button shaped but too large to fold significantly above or below one another radially when the retractable hose is in its retracted state.

When used in the claims, "wear resistant dot" should be understood to mean, one of a plurality of wear resistant structures on the exterior surface of a retractable hose cover that are small enough to fold significantly above or below one another radially when the retractable hose is in its retracted state.

When used in the claims, "convoluted" should be understood to mean, a structural shape comprising a single ridge and a single valley shaped in a spiral or helical path along the length of a tube-like structure. A structure similar to the threads on a screw.

When used in the claims, "corrugated" should be understood to mean, a structural shape comprising alternating circular ridges and circular valleys positioned along the length of a tube-like structure.

What is claimed is:

1. A hose having a first end and a second end configured to extend when an extending force exceeds a retracting force and to retract when the retracting force exceeds the extending force, the hose comprising:
   a) a tube-shaped outer cover with an extended length and a retracted length, wherein the outer cover can longitudinally extend to the extended length and longitudinally retract to the retracted length;
   b) an inner elastic hose capable of stretching to at least two times its natural length and having a tendency to return to its natural length when stretched, wherein:
      i) the inner elastic hose is positioned inside of the tube-shaped outer cover;
      ii) the inner elastic hose comprises an outer surface comprising:
         A) one or more portions engaged with the outer cover and disposed between the first and second ends of the hose; and
         B) one or more portions freely movable with respect to the outer cover and disposed between the first and second ends of the hose;
      iii) the extending force is generated by a pressure differential between fluid within the inner elastic hose and an ambient environment at lower pressure than the fluid within the inner plastic hose;
      iv) the retracting force is generated by the tendency of the inner elastic hose to return to its natural length when stretched;

c) an input connector attached, at the first end of the hose, to both the outer cover and the inner elastic hose and designed to be removably attached to a source of pressurized fluid; and d) an output connector attached, at the second end of the hose, to both the outer cover and the inner elastic hose and designed to removably connect to a flow restricting device;

wherein one or more structures are affixed to the outer cover, wherein each structure from the one or more structures comprises a material having a greater resistance to wear than the outer cover.

2. The hose of claim 1 wherein each of the one or more portions of the outer surface of the inner elastic hose which is engaged with the outer cover and disposed between the first and second ends of the hose is bonded to the outer cover.

3. The hose of claim 2 wherein the each of the one or more portions of the outer surface of the inner elastic hose which is engaged with the outer cover is bonded to the outer cover by an activated adhesive composition comprising a bonding component responsive to heat and a microwave radiation absorbing compound intermixed with the bonding component.

4. The hose of claim 1, wherein the inner elastic hose comprises an outer surface with a natural diameter greater than about 60 percent of a diameter of the tube shaped outer cover's interior surface.

5. The hose of claim 4, wherein the natural diameter of the outer surface of the inner elastic hose is greater than about 100 percent of the diameter of the tube shaped outer cover's interior surface.

6. The hose of claim 1 wherein each of the one or more portions of the outer surface of the inner elastic hose which is engaged with the outer cover and disposed between the first and second ends of the hose:
   a) has a stretched radius when the hose is extended and a natural radius when the hose is retracted, wherein the natural radius is less than the extended radius and wherein the extended radius is about equal to an inner radius of the tube shaped outer cover; and
   b) is frictionally engaged with the outer cover when the hose is extended.

7. The hose of claim 6, wherein each of the one or more portions engaged with the outer cover has a coating providing a friction coefficient of greater than about 0.5 between the inner elastic hose and the outer cover.

8. The hose of claim 6, wherein the outer cover comprises an interior surface coated with an inner layer providing a friction coefficient greater than about 0.5 between the outer cover and the one or more portions engaged with the outer cover.

9. The hose of claim 6 wherein the natural radius of each of the one or more portions engaged with the outer cover is about equal to the inner radius of the tube shaped outer cover.

10. The hose of claim 6, wherein:
    a) the outer cover has an unrestricted pressurized inner radius, a restricted pressurized inner radius, and an unrestricted pressurized outer radius;
    b) for each of the one or more portions of the outer surface of the inner elastic hose which is engaged with the outer cover and disposed between the first and second ends of the hose, the inner radius of the tube shaped outer cover which is about equal to the extended radius of that portion of the inner hose is the restricted pressurized inner radius;
    c) the unrestricted pressurized inner radius of the outer cover is greater than the restricted pressurized inner radius of the outer cover, and is less than the unrestricted pressurized outer radius of the outer cover;
    d) the hose comprises a plurality of rings, wherein each ring from the plurality of rings:
       i) has an inside diameter smaller than the unrestricted pressurized inner radius of the outer cover of the hose;
       has an outside diameter larger than the unrestricted pressurized outer radius of the outer cover of the hose; and
       iii) is disposed outside of the outer cover of the hose and at a location along the length of the outer cover where one of the one or more portions of the inner hose is engaged with the outer cover.

11. The hose of claim 1, wherein the inner elastic hose is a constant radius cylindrical hose.

12. The hose in claim 1, wherein;
    a) the inner elastic hose has a shape comprising one or more ridges;
    b) the one or more portions of the outer surface of the inner elastic hose which are engaged with the outer cover and which are disposed between the first and second ends of the hose are located at the one or more ridges' apexes.

13. The hose in claim 12 wherein the ridged shape is a corrugated shape.

14. The hose of claim 12 wherein the ridged shape is a convoluted shape.

15. The hose of claim 14 wherein the one or more portions of the outer surface of the inner elastic hose which are engaged with the outer cover and which are disposed between the first and second ends of the hose consist of a single continuous portion of the outer surface of the inner hose on the convoluted shape's outermost portion.

16. The hose of claim 12, wherein the hose further comprises, at each of the one or more portions of the outer surface of the inner elastic hose which is engaged with the outer cover and which is disposed between the first and second ends of the hose, a bonding spacer filling a gap between the outer surface of the inner elastic hose and an inner surface of the outer cover.

17. The hose of claim 1, wherein the outer cover is a porous hydrophobic outer cover.

18. The hose of claim 1, wherein the one or more structures comprise at least one structure selected from the group consisting of:
    a) a wear resistant button;
    b) a wear resistant dot;
    c) a wear resistant line;
    d) a wear resistant ring, and
    e) a wear resistant coil.

19. A hose having a first end and a second end configured to extend when an extending force exceeds a retracting force and to retract when the retracting force exceeds the extending force, the hose comprising:
    a) a tube-shaped outer cover with an extended length and a retracted length, wherein the outer cover can longitudinally extend to the extended length and longitudinally retract to the retracted length;
    b) an inner elastic hose capable of stretching to at least two times its natural length and having a tendency to return to its natural length when stretched, wherein:
       i) the inner elastic hose is positioned inside of the tube-shaped outer cover;
       ii) the inner elastic hose comprises an outer surface with a natural diameter greater than about 60 percent of a diameter of the tube shaped outer cover's interior surface;
       iii) the extending force is generated by a pressure differential between fluid within the inner elastic hose and an ambient environment at lower pressure than the fluid within the inner plastic hose;

iv) the retracting force is generated by the tendency of the inner elastic hose to return to its natural length when stretched;

c) an input connector attached, at the first end of the hose, to both the outer cover and the inner elastic hose and designed to be removably attached to a source of pressurized fluid; and d) an output connector attached, at the second end of the hose, to both the outer cover and the inner elastic hose and designed to removably connect to a flow restricting device;

wherein the inner elastic hose comprises an outer surface comprising:

A) one or more portions engaged with the outer cover and disposed between the first and second ends of the hose; and B) one or more portions freely movable with respect to the outer cover and disposed between the first and second ends of the hose;

wherein the one or more portions of the inner elastic hose are engaged with the outer cover by one or more bonds formed by an activated adhesive composition comprising a bonding component responsive to heat and a microwave radiation absorbing compound intermixed with the bonding component.

20. The hose of claim 19, wherein the inner elastic hose comprises a substantially cylindrical outer surface.

21. The hose of claim 19, wherein the natural diameter of the outer surface of the inner elastic hose is greater than about 65 percent of the diameter of the tube shaped outer cover's interior surface.

22. A hose having a first end and a second end configured to extend when an extending force exceeds a retracting force and to retract when the retracting force exceeds the extending force, the hose comprising:

a) a tube-shaped outer cover with an extended length and a retracted length, wherein the outer cover can longitudinally extend to the extended length and longitudinally retract to the retracted length;

b) an inner elastic hose capable of stretching to at least two times its natural length and having a tendency to return to its natural length when stretched, wherein:

i) the inner elastic hose is positioned inside of the tube-shaped outer cover;

ii) the inner elastic hose comprises an outer surface comprising:

A) one or more portions engaged with the outer cover and disposed between the first and second ends of the hose; and B) one or more portions freely movable with respect to the outer cover and disposed between the first and second ends of the hose;

iii) the extending force is generated by a pressure differential between fluid within the inner elastic hose and an ambient environment at lower pressure than the fluid within the inner plastic hose;

iv) the retracting force is generated by the tendency of the inner elastic hose to return to its natural length when stretched;

c) an input connector attached, at the first end of the hose, to both the outer cover and the inner elastic hose and designed to be removably attached to a source of pressurized fluid; and d) an output connector attached, at the second end of the hose, to both the outer cover and the inner elastic hose and designed to removably connect to a flow restricting device;

wherein each of the one or more portions of the outer surface of the inner elastic hose which is engaged with the outer cover and disposed between the first and second ends of the hose is bonded to the outer cover;

wherein the each of the one or more portions of the outer surface of the inner elastic hose which is engaged with the outer cover is bonded to the outer cover by an activated adhesive composition comprising a bonding component responsive to heat and a microwave radiation absorbing compound intermixed with the bonding component.

23. A hose having a first end and a second end configured to extend when an extending force exceeds a retracting force and to retract when the retracting force exceeds the extending force, the hose comprising:

a) a tube-shaped outer cover with an extended length and a retracted length, wherein the outer cover can longitudinally extend to the extended length and longitudinally retract to the retracted length;

b) an inner elastic hose capable of stretching to at least two times its natural length and having a tendency to return to its natural length when stretched, wherein:

i) the inner elastic hose is positioned inside of the tube-shaped outer cover;

ii) the inner elastic hose comprises an outer surface comprising:

A) one or more portions engaged with the outer cover and disposed between the first and second ends of the hose; and B) one or more portions freely movable with respect to the outer cover and disposed between the first and second ends of the hose;

iii) the extending force is generated by a pressure differential between fluid within the inner elastic hose and an ambient environment at lower pressure than the fluid within the inner plastic hose;

iv) the retracting force is generated by the tendency of the inner elastic hose to return to its natural length when stretched;

c) an input connector attached, at the first end of the hose, to both the outer cover and the inner elastic hose and designed to be removably attached to a source of pressurized fluid; and d) an output connector attached, at the second end of the hose, to both the outer cover and the inner elastic hose and designed to removably connect to a flow restricting device;

wherein each of the one or more portions of the outer surface of the inner elastic hose which is engaged with the outer cover and disposed between the first and second ends of the hose:

A) has a stretched radius when the hose is extended and a natural radius when the hose is retracted, wherein the natural radius is less than the extended radius and wherein the extended radius is about equal to an inner radius of the tube shaped outer cover; and B) is frictionally engaged with the outer cover when the hose is extended.

24. The hose of claim 23, wherein each of the one or more portions engaged with the outer cover has a coating providing a friction coefficient of greater than about 0.5 between the inner elastic hose and the outer cover.

25. The hose of claim 23, wherein the outer cover comprises an interior surface coated with an inner layer providing a friction coefficient greater than about 0.5 between the outer cover and the one or more portions engaged with the outer cover.

26. The hose of claim 23 wherein the natural radius of each of the one or more portions engaged with the outer cover is about equal to the inner radius of the tube shaped outer cover.

27. The hose of claim 23, wherein:
 a) the outer cover has an unrestricted pressurized inner radius, a restricted pressurized inner radius, and an unrestricted pressurized outer radius;
 b) for each of the one or more portions of the outer surface of the inner elastic hose which is engaged with the outer cover and disposed between the first and second ends of the hose, the inner radius of the tube shaped outer cover which is about equal to the extended radius of that portion of the inner hose is the restricted pressurized inner radius;
 c) the unrestricted pressurized inner radius of the outer cover is greater than the restricted pressurized inner radius of the outer cover, and is less than the unrestricted pressurized outer radius of the outer cover;
 d) the hose comprises a plurality of rings, wherein each ring from the plurality of rings:
  i) has an inside diameter smaller than the unrestricted pressurized inner radius of the outer cover of the hose;
  ii) has an outside diameter larger than the unrestricted pressurized outer radius of the outer cover of the hose; and
  iii) is disposed outside of the outer cover of the hose and at a location along the length of the outer cover where one of the one or more portions of the inner hose is engaged with the outer cover.

28. A hose having a first end and a second end configured to extend when an extending force exceeds a retracting force and to retract when the retracting force exceeds the extending force, the hose comprising:
 a) a tube-shaped outer cover with an extended length and a retracted length, wherein the outer cover can longitudinally extend to the extended length and longitudinally retract to the retracted length;
 b) an inner elastic hose capable of stretching to at least two times its natural length and having a tendency to return to its natural length when stretched, wherein:
  i) the inner elastic hose is positioned inside of the tube-shaped outer cover;
  ii) the inner elastic hose comprises an outer surface comprising:
   A) one or more portions engaged with the outer cover and disposed between the first and second ends of the hose; and
   B) one or more portions freely movable with respect to the outer cover and disposed between the first and second ends of the hose;
  iii) the extending force is generated by a pressure differential between fluid within the inner elastic hose and an ambient environment at lower pressure than the fluid within the inner plastic hose;
  iv) the retracting force is generated by the tendency of the inner elastic hose to return to its natural length when stretched;
 c) an input connector attached, at the first end of the hose, to both the outer cover and the inner elastic hose and designed to be removably attached to a source of pressurized fluid; and
 d) an output connector attached, at the second end of the hose, to both the outer cover and the inner elastic hose and designed to removably connect to a flow restricting device;
 wherein:
 A) the inner elastic hose has a shape comprising one or more ridges;
 B) the one or more portions of the outer surface of the inner elastic hose which are engaged with the outer cover and which are disposed between the first and second ends of the hose are located at the one or more ridges' apexes;
 wherein the hose further comprises, at each of the one or more portions of the outer surface of the inner elastic hose which is engaged with the outer cover and which is disposed between the first and second ends of the hose, a bonding spacer filling a gap between the outer surface of the inner elastic hose and an inner surface of the outer cover.

29. A hose having a first end and a second end configured to extend when an extending force exceeds a retracting force and to retract when the retracting force exceeds the extending force, the hose comprising:
 a) a tube-shaped outer cover with an extended length and a retracted length, wherein the outer cover can longitudinally extend to the extended length and longitudinally retract to the retracted length;
 b) an inner elastic hose capable of stretching to at least two times its natural length and having a tendency to return to its natural length when stretched, wherein:
  i) the inner elastic hose is positioned inside of the tube-shaped outer cover;
  ii) the inner elastic hose comprises an outer surface comprising:
   A) one or more portions engaged with the outer cover and disposed between the first and second ends of the hose; and
   B) one or more portions freely movable with respect to the outer cover and disposed between the first and second ends of the hose;
  iii) the extending force is generated by a pressure differential between fluid within the inner elastic hose and an ambient environment at lower pressure than the fluid within the inner plastic hose;
  iv) the retracting force is generated by the tendency of the inner elastic hose to return to its natural length when stretched;
 c) an input connector attached, at the first end of the hose, to both the outer cover and the inner elastic hose and designed to be removably attached to a source of pressurized fluid; and
 d) an output connector attached, at the second end of the hose, to both the outer cover and the inner elastic hose and designed to removably connect to a flow restricting device;
 wherein the outer cover is a porous hydrophobic outer cover.

* * * * *

UNITED STATES PATENT AND TRADEMARK OFFICE
CERTIFICATE OF CORRECTION

PATENT NO. : 8,936,046 B2
APPLICATION NO. : 14/075963
DATED : January 20, 2015
INVENTOR(S) : Gary Dean Ragner It is certified that error appears in the above-identified patent and that said Letters Patent is hereby corrected as shown below:

In The Claims

Column 44, Claim 10, line 7, reads

"...has an outside diameter...";

which should be deleted and replaced with

"...ii) has an outside diameter..."

Signed and Sealed this
Twenty-eighth Day of April, 2015

Michelle K. Lee
*Director of the United States Patent and Trademark Office*